United States Patent
Huang et al.

(10) Patent No.: US 10,353,193 B2
(45) Date of Patent: Jul. 16, 2019

(54) ULTRA-WIDE ANGLE CAMERA LENS

(71) Applicant: ZHEJIANG SUNNY OPTICS CO., LTD., Ningbo, Zhejiang (CN)

(72) Inventors: Lin Huang, Zhejiang (CN); Fujian Dai, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 363 days.

(21) Appl. No.: 15/329,165

(22) PCT Filed: Jul. 19, 2016

(86) PCT No.: PCT/CN2016/090443
§ 371 (c)(1),
(2) Date: Jan. 25, 2017

(87) PCT Pub. No.: WO2017/148078
PCT Pub. Date: Sep. 8, 2017

(65) Prior Publication Data
US 2018/0335618 A1    Nov. 22, 2018

(30) Foreign Application Priority Data
Mar. 2, 2016  (CN) .......................... 2016 1 0117705

(51) Int. Cl.
*G02B 25/04* (2006.01)
*G02B 13/00* (2006.01)
(Continued)

(52) U.S. Cl.
CPC ............ *G02B 25/04* (2013.01); *G02B 13/00* (2013.01); *G02B 13/06* (2013.01); *G02B 13/18* (2013.01)

(58) Field of Classification Search
CPC .... G02B 25/04; G02B 13/00; G02B 13/0045; G02B 13/06; G02B 13/18
(Continued)

(56) References Cited

U.S. PATENT DOCUMENTS 6,937,391 B2 * 8/2005 Hirunuma ............... G02B 23/18
                                                                    348/E5.024
9,036,277 B2   5/2015 Kubota et al.
(Continued)

FOREIGN PATENT DOCUMENTS

CN    101034199 A    9/2007
CN    203350520 U   12/2013
CN    105572847 A    5/2016

OTHER PUBLICATIONS

International Search Report for corresponding International Application No. PCT/CN2016/090443, dated Nov. 4, 2016.

*Primary Examiner* — Frank G Font
(74) *Attorney, Agent, or Firm* — David D. Brush; Westman, Champlin & Koehler, P.A.

(57) ABSTRACT

An ultra-wide angle camera lens is provided. The lens includes, from an object side to an image side: a first lens with negative refractive power, an image-side face of the first lens being concave; a second lens with negative refractive power, an image-side face of the second lens being concave; a third lens with positive refractive power, an object-side face of the third lens being convex; a fourth lens with positive refractive power, an image-side face of the fourth lens being convex; and a fifth lens with negative refractive power, an image-side face of the fifth lens being concave. The lens satisfies: $-0.05 < f/f1 < 0$; and $1.2 < \mathrm{ImgH}/f < 2$, in which, f represents an effective focus length of the ultra-wide angle camera lens, f1 represents an effective focus length of the first lens L1, and ImgH is half of a diagonal line of an effective pixel region on an imaging face.

9 Claims, 15 Drawing Sheets

(51) Int. Cl.
*G02B 13/06* (2006.01)
*G02B 13/18* (2006.01)

(58) Field of Classification Search
USPC .......................................... 359/425, 714, 770
See application file for complete search history.

(56) References Cited

U.S. PATENT DOCUMENTS

| | | |
|---|---|---|
| 2011/0316969 A1 | 12/2011 | Hsieh et al. |
| 2014/0307334 A1 | 10/2014 | Chen |
| 2016/0231532 A1* | 8/2016 | Huang .................... G02B 13/06 |
| 2016/0252710 A1* | 9/2016 | Lee .................... G02B 13/0045 |
| | | 359/714 |
| 2018/0017764 A1* | 1/2018 | Kang ....................... G02B 9/60 |

* cited by examiner

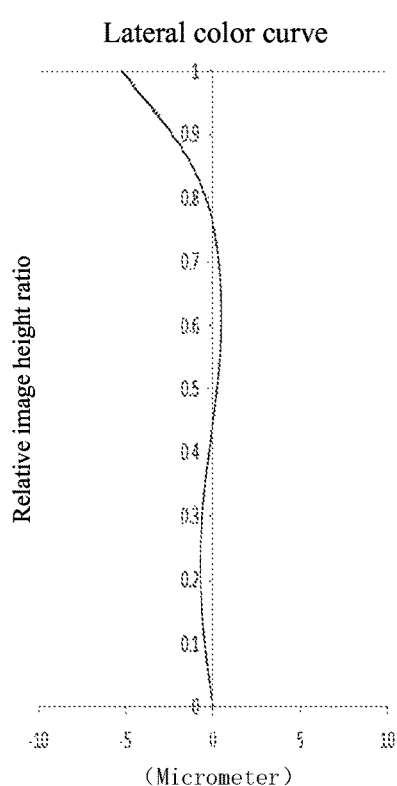
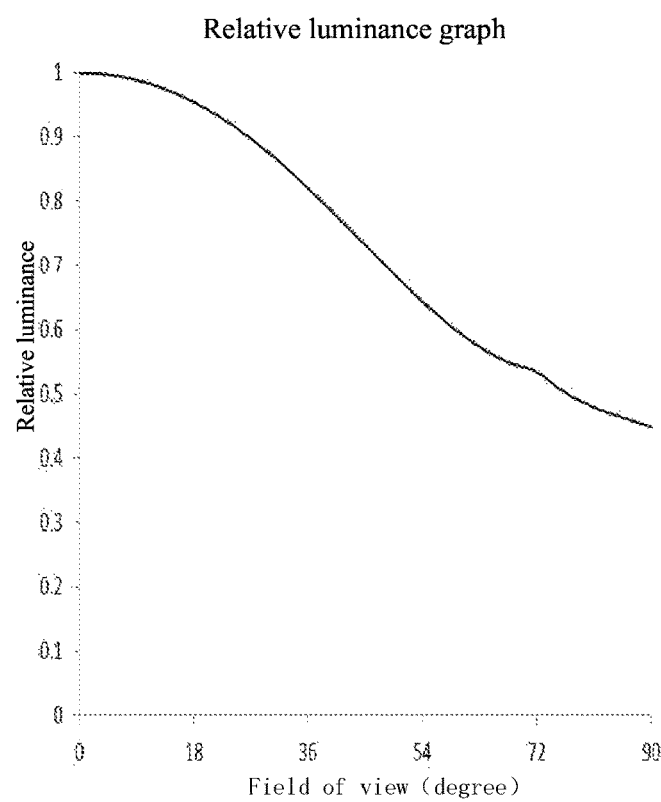
Fig.14
Fig.15
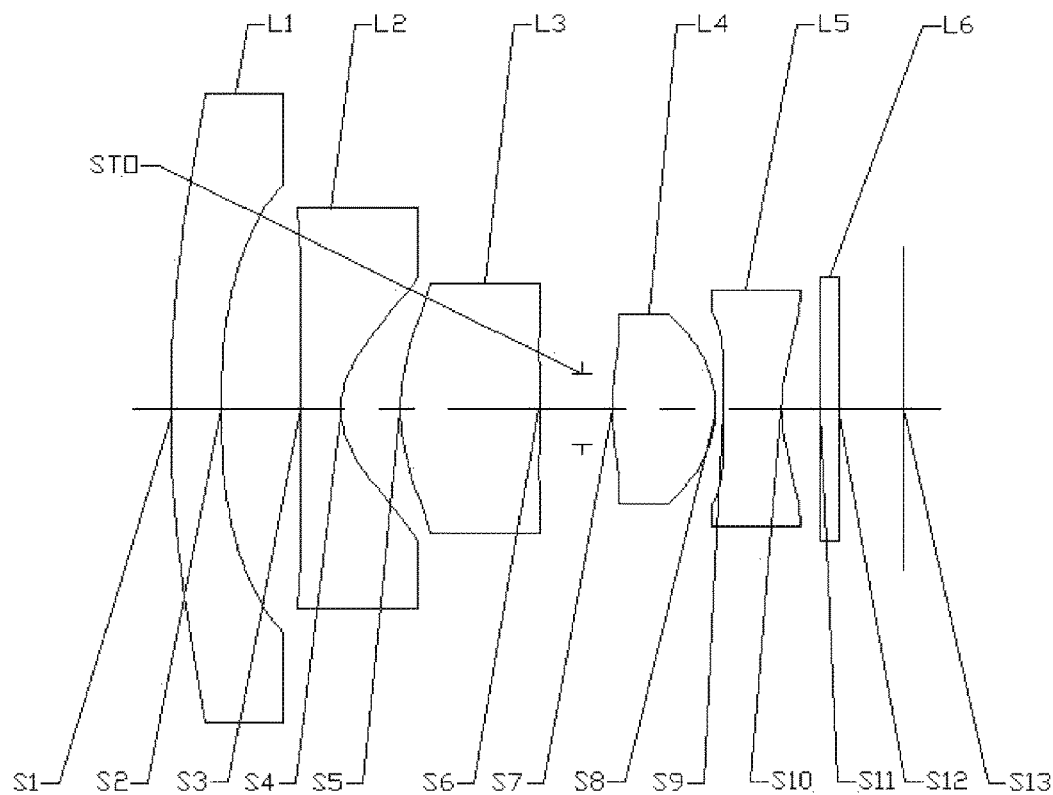
Fig.16

Longitudinal aberration graph (Millimeter)

Astigmatism graph (Millimeter)

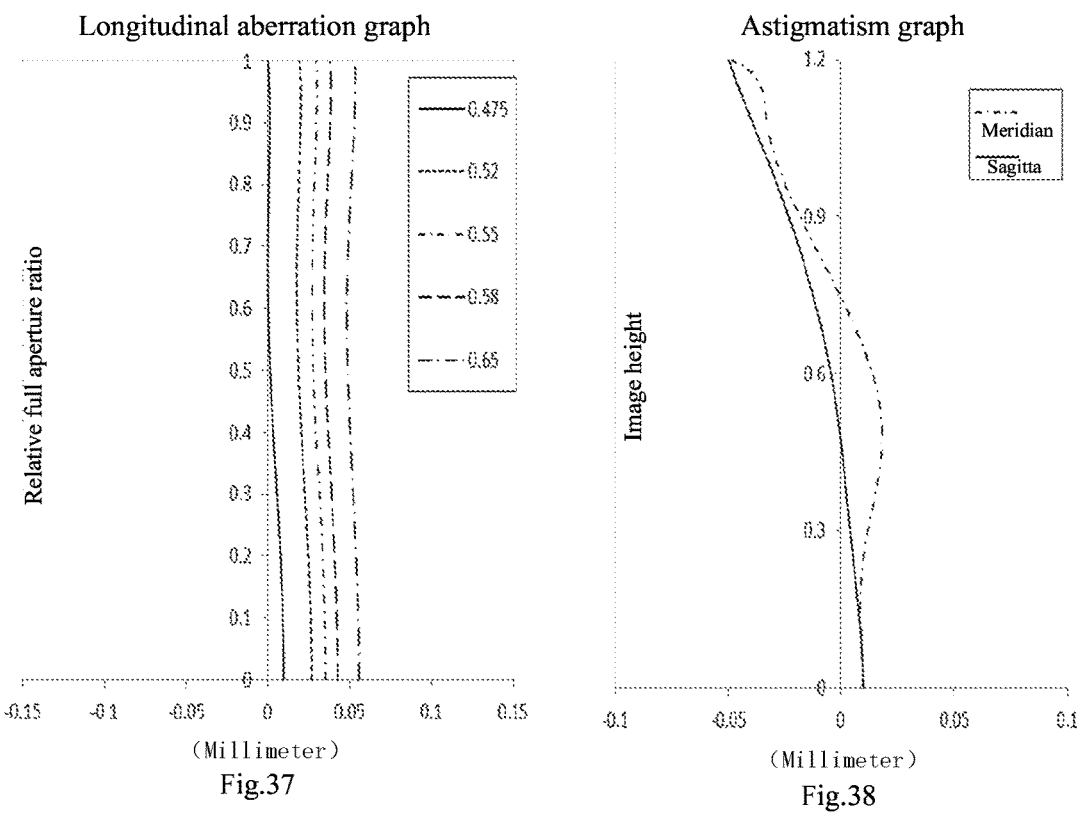
Fig.37
Fig.38
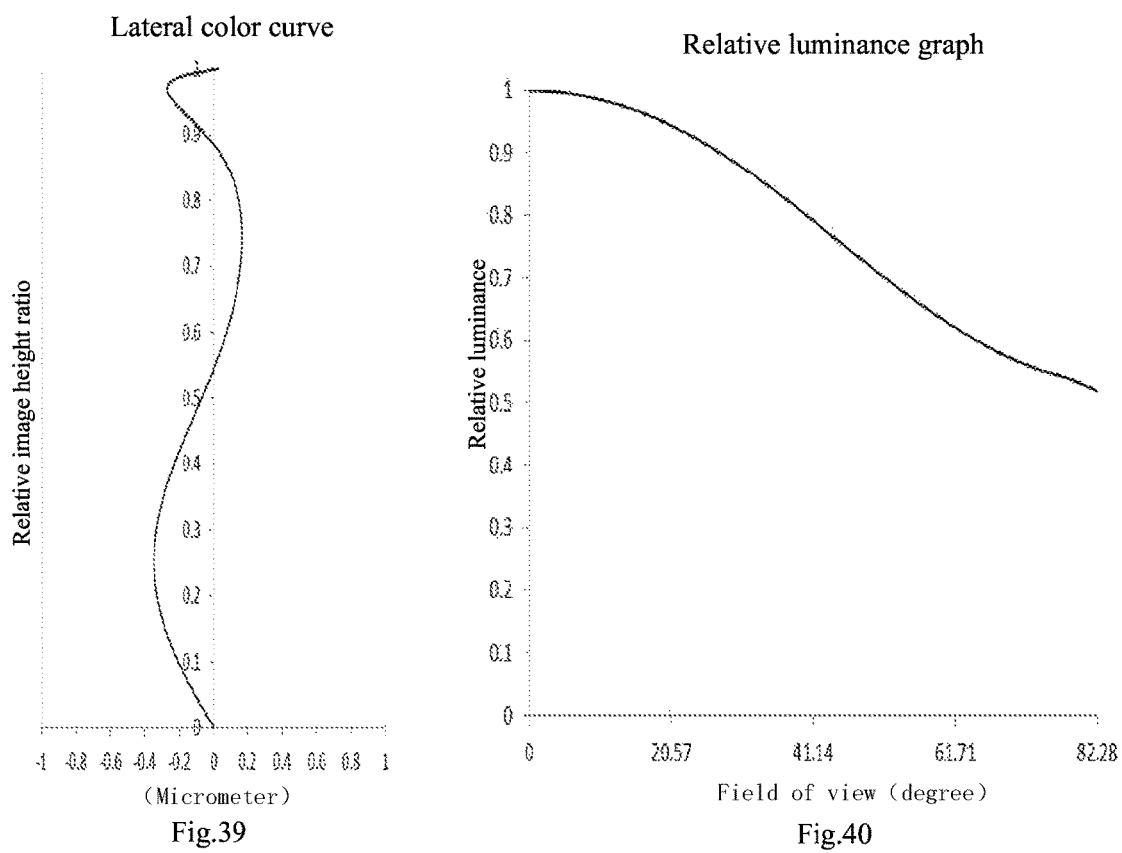
Fig.39
Fig.40

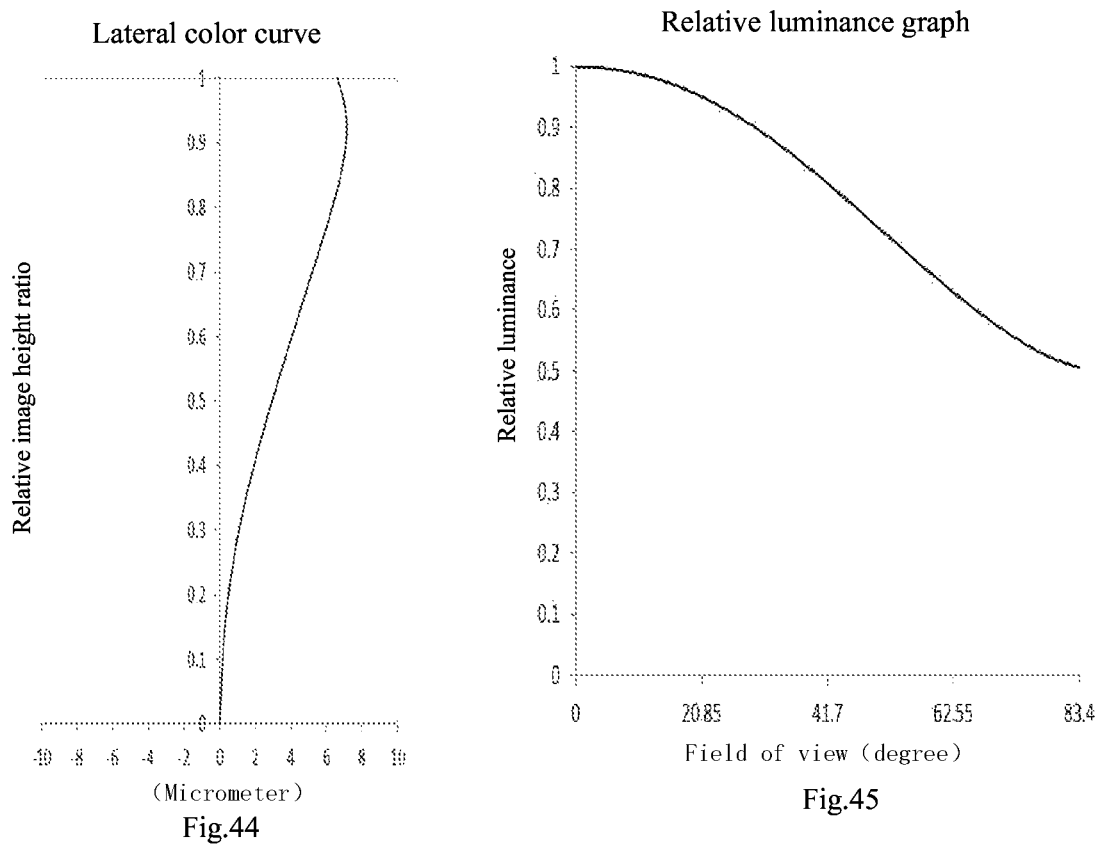
Fig.44
Fig.45
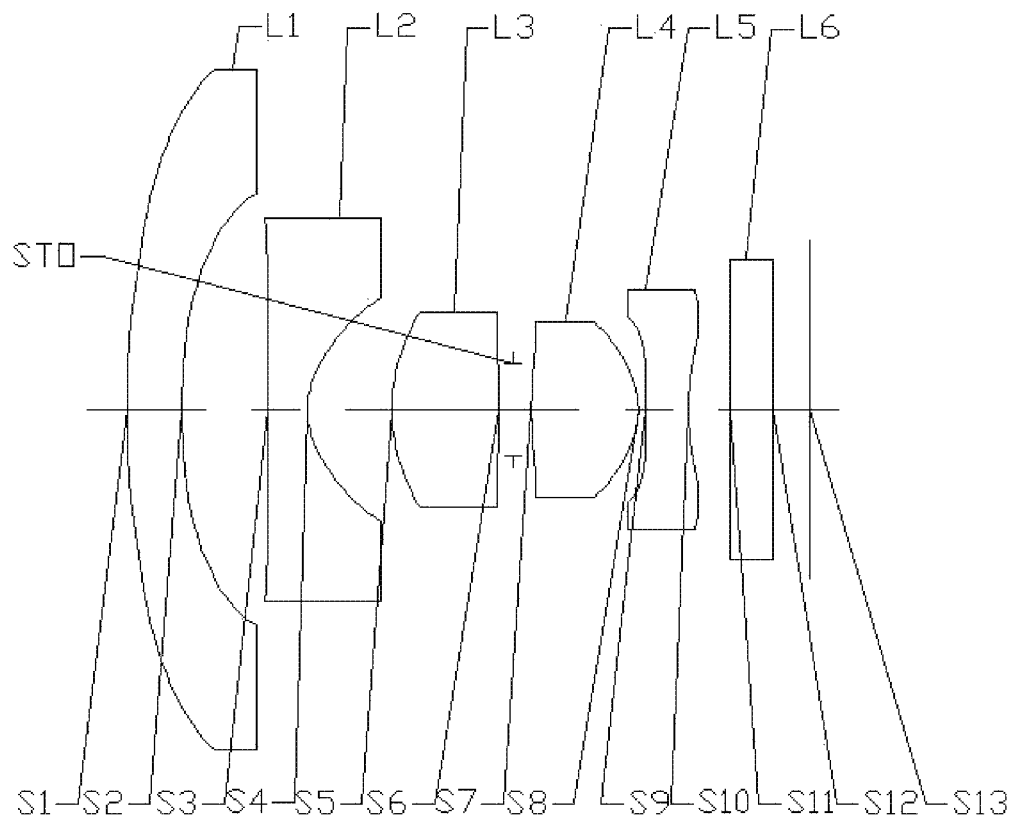
Fig.46

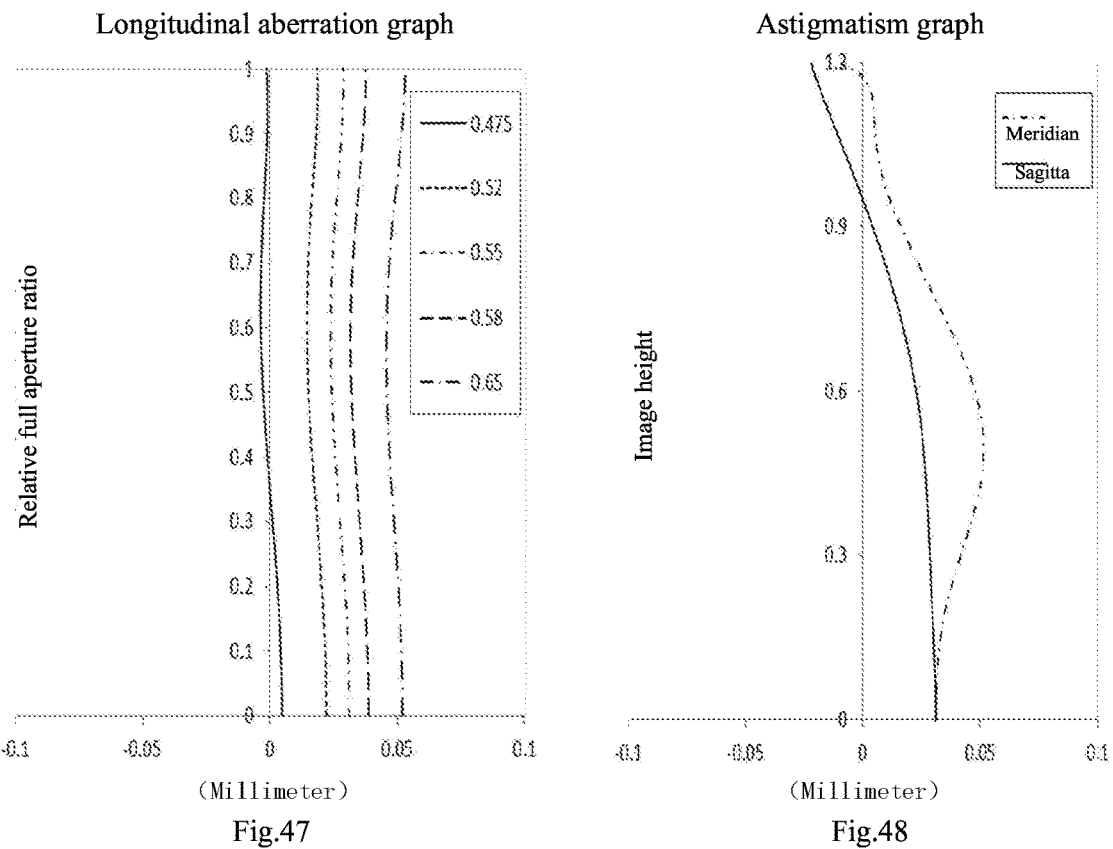
Fig.47
Fig.48
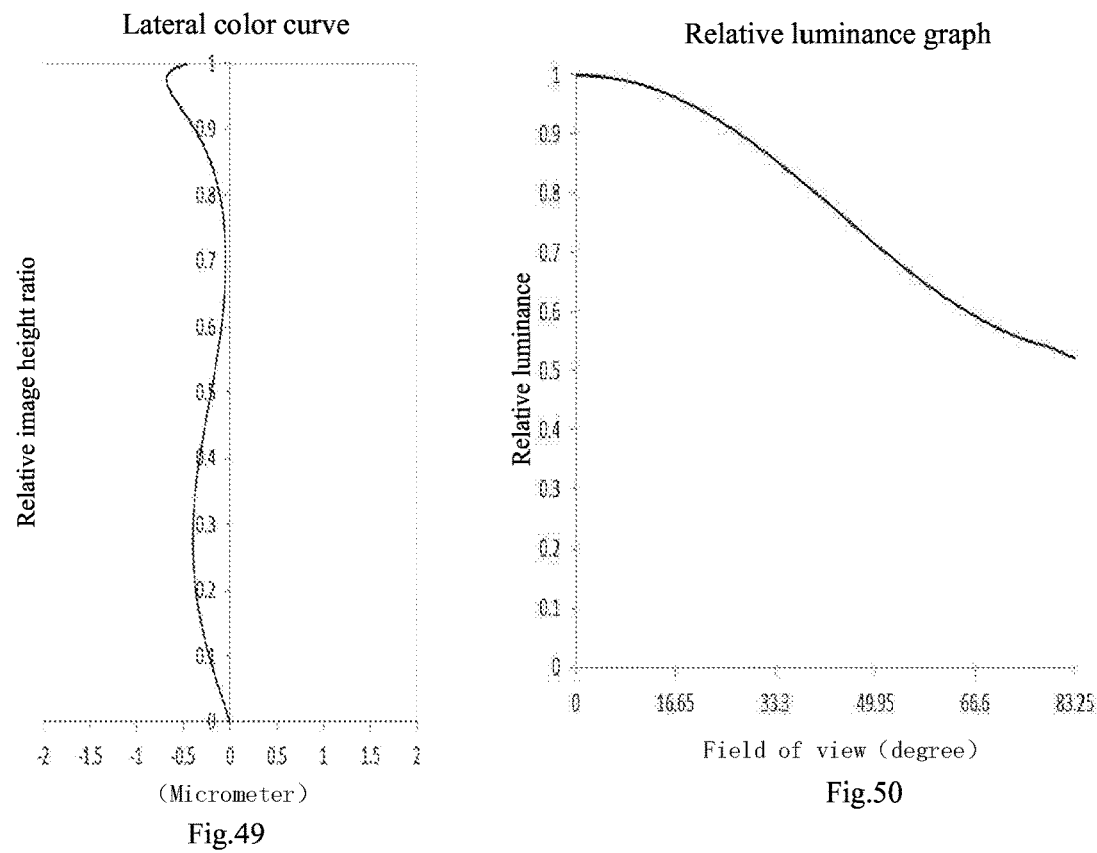
Fig.49
Fig.50

ULTRA-WIDE ANGLE CAMERA LENS

CROSS-REFERENCE TO RELATED APPLICATION

This Application is a Section 371 National Stage Application of International Application No. PCT/CN2016/090443, filed Jul. 19, 2016, and published as WO 2017/148078 A1 on Sep. 8, 2017, not in English, which claims priority to and benefits of Chinese Patent Application Serial No. 201610117705.0, filed with the State Intellectual Property Office of P. R. China on Mar. 2, 2016, the entire contents of which are incorporated herein by reference.

FIELD

The present disclosure relates to the field of camera shooting technology, and more particularly to a thin ultra-wide angle camera lens.

BACKGROUND

In recent years, portable electronic products spring up step by step along with technological development, and particularly portable electronic products capable of shooting win the good graces of people. A photosensitive element of a general optical system is nothing more than the charge-coupled device (CCD) or the complementary metal-oxide-semiconductor (CMOS). Along with technical development of semiconductor manufacturing process, the pixel size of the photosensitive element decreases, the optical system tends to have a higher pixel, and the pixel size of a chip becomes smaller and smaller, which require higher and higher imaging quality of a matching optical system.

An existing three-piece camera lens or four-piece camera lens cannot meet requirements of high-quality wide angle camera lens in the market, which certainly will increase the number of lenses to improve the imaging quality of the camera lens, but the increase of lens easily results in an overlong overall length of the camera lens and goes against miniaturization and light weight of the camera lens.

SUMMARY

Embodiments of the present disclosure seek to solve at least one of the problems existing in the related art to at least some extent and provide an ultra-wide angle camera lens.

An ultra-wide angle camera lens sequentially includes: from an object side to an image side, a first lens with negative refractive power, an image-side face of the first lens being concave;

a second lens with negative refractive power, an image-side face of the second lens being concave;

a third lens with positive refractive power, an object-side face of the third lens being convex;

a fourth lens with positive refractive power, an image-side face of the fourth lens being convex; and a fifth lens with negative refractive power, an image-side face of the fifth lens being concave, in which the ultra-wide angle camera lens satisfies the following relation: $-0.05<f/f1<0$, and $1.2<ImgH/f<2$, in which f represents an effective focus length of the ultra-wide angle camera lens, f1 represents an effective focus length of the first lens, and ImgH is half of a diagonal line of an effective pixel region on an imaging face.

The ultra-wide angle camera lens satisfying the above configuration has an ultra-wide angle, a long depth of field and a wide coverage; can effectively correct various aberrations to smooth relative luminance; and can facilitate shortening a system length of the ultra-wide angle camera lens to ensure miniaturization of the ultra-wide angle camera lens.

In an embodiment, the ultra-wide angle camera lens satisfies the following relation: $-1.4<f2/f4<-0.7$, and $-1.5<f2/f<-1$, in which, f2 represents an effective focus length of the second lens, and f4 represents an effective focus length of the fourth lens.

In an embodiment, the ultra-wide angle camera lens satisfies the following relation: $1<DT22/DT31<1.2$, and $1<DT31/DT52<1.35$, in which, DT22 represents an effective radius of the image-side face of the second lens, DT31 represents an effective radius of the object-side face of the third lens, and DT52 represents an effective radius of the image-side face of the fifth lens.

In an embodiment, the ultra-wide angle camera lens satisfies the following relation: $TTL/ImgH<4.6$, in which, TTL represents a distance between an object-side face of the first lens and an imaging face along an axis.

In an embodiment, the ultra-wide angle camera lens satisfies the following relation: $0<T34/TTL<0.1$, and $0.05<T23/TTL<0.16$, in which, T34 represents a spacing distance between the third lens and the fourth lens along an axis, TTL represents a distance between an object-side face of the first lens and an imaging face along the axis, and T23 represents a spacing distance between the second lens and the third lens along the axis.

In an embodiment, the ultra-wide angle camera lens satisfies the following relation: $0.4<\Sigma CT/TTL<0.6$, in which, $\Sigma CT$ represents an sum of thicknesses of the first lens, the second lens, the third lens, the fourth lens and the fourth lens along an optical axis, and TTL represents a distance between an object-side face of the first lens and an imaging face along an axis.

In an embodiment, the ultra-wide angle camera lens satisfies the following relation: $0.6<CT1/CT5<1.35$, and $0.65<CT2/CT5<1$, in which, CT1 represents a central thicknesses of the first lens along an optical axis, CT2 represents a central thicknesses of the second lens along the optical axis, and CT5 represents a central thicknesses of the fifth lens along the optical axis.

In an embodiment, the ultra-wide angle camera lens satisfies the following relation: $1<R1/R2<1.5$, in which, R1 represents a radius of curvature of an object-side face of the first lens, and R2 represents a radius of curvature of an object-side face of the second lens.

In an embodiment, an image-side face of the third lens is convex, and an object-side face of the fourth lens is convex.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 14 is a graph (μm) of a lateral color curve of the ultra-wide angle camera lens according to the third embodiment;

FIG. 15 is a relative luminance graph of the ultra-wide angle camera lens according to the third embodiment;

FIG. 16 is a schematic view of an ultra-wide angle camera lens according to a fourth embodiment;

FIG. 37 is a longitudinal aberration graph (mm) of the ultra-wide angle camera lens according to the eighth embodiment;

FIG. 38 is an astigmatism graph (mm) of the ultra-wide angle camera lens according to the eighth embodiment;

FIG. 39 is a graph (μm) of lateral color curve of the ultra-wide angle camera lens according to the eighth embodiment;

FIG. 40 is a relative luminance graph of the ultra-wide angle camera lens according to the eighth embodiment;

FIG. 44 is a graph (μm) of lateral color curve of the ultra-wide angle camera lens according to the ninth embodiment;

FIG. 45 is a relative luminance graph of the ultra-wide angle camera lens according to the ninth embodiment;

FIG. 46 is a schematic view of an ultra-wide angle camera lens according to a tenth embodiment;

FIG. 47 is a longitudinal aberration graph (mm) of the ultra-wide angle camera lens according to the tenth embodiment;

FIG. 48 is an astigmatism graph (mm) of the ultra-wide angle camera lens according to the tenth embodiment;

FIG. 49 is a graph (μm) of lateral color curve of the ultra-wide angle camera lens according to the tenth embodiment; and FIG. 50 is a relative luminance graph of the ultra-wide angle camera lens according to the tenth embodiment.

DETAILED DESCRIPTION

Figure 1:
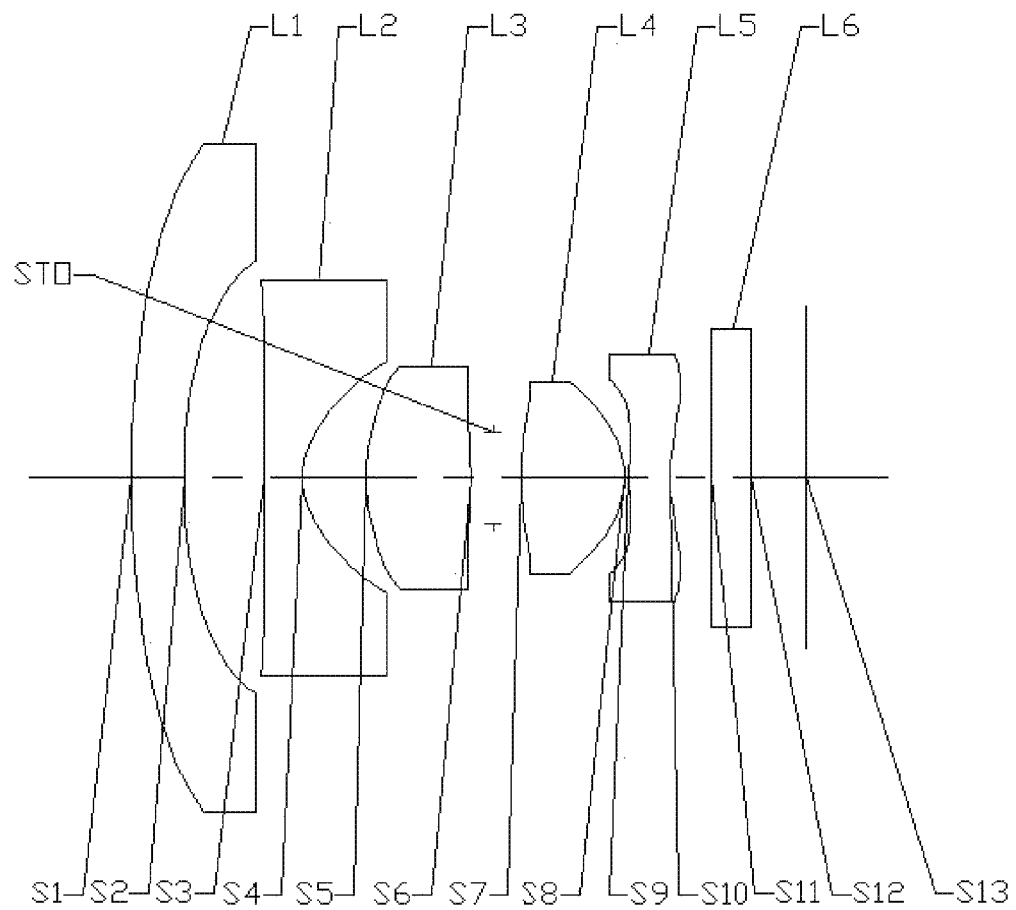
FIG. 1 is a schematic view of an ultra-wide angle camera lens according to a first embodiment.
Figure 2:
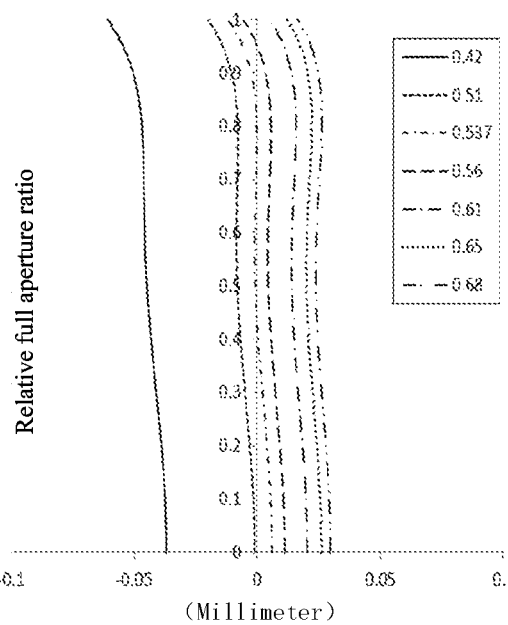
FIG. 2 is a longitudinal aberration graph (mm) of the ultra-wide angle camera lens according to the first embodiment.
Figure 3:
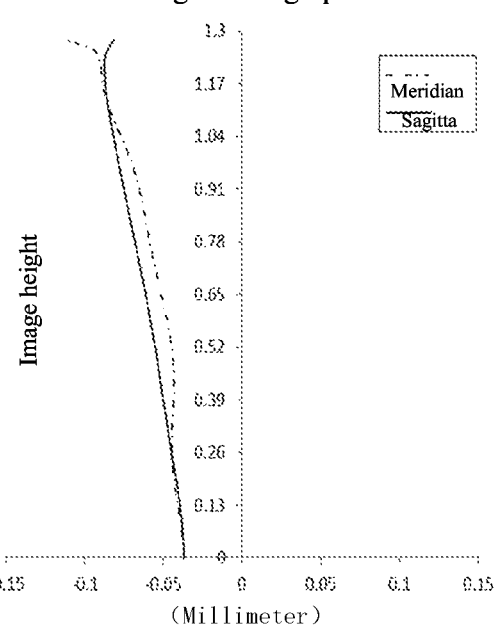
FIG. 3 is an astigmatism graph (mm) of the ultra-wide angle camera lens according to the first embodiment.
Figures 4, 5:
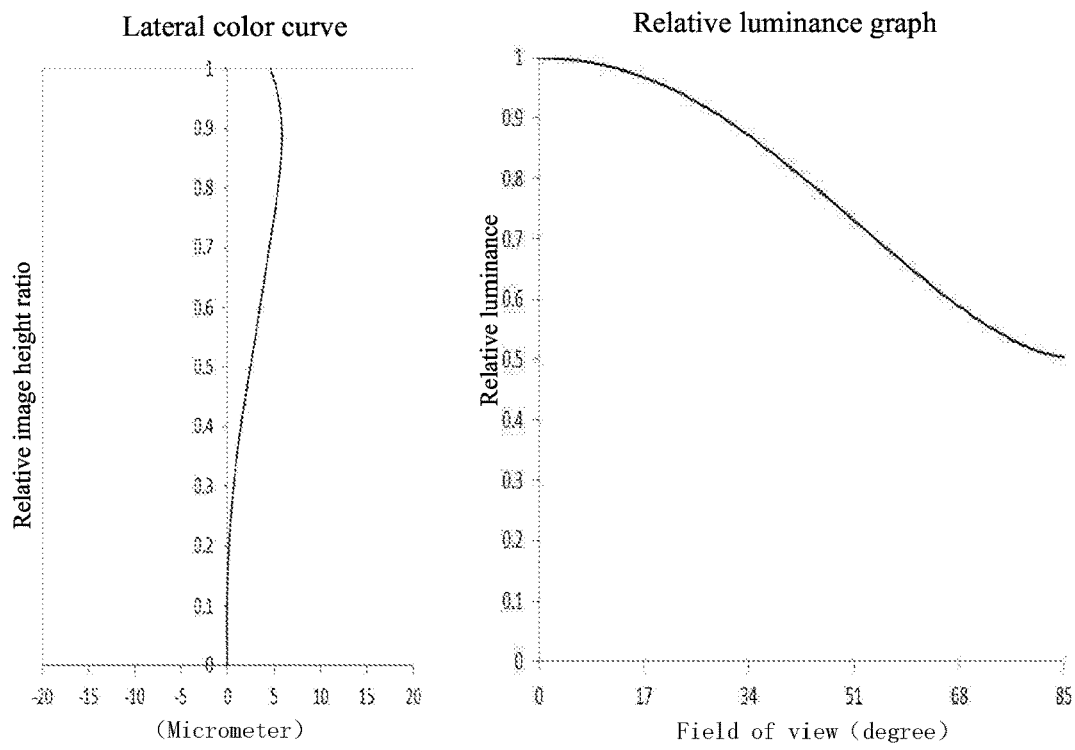
FIG. 4 is a graph (μm) of a lateral color curve of the ultra-wide angle camera lens according to the first embodiment.
FIG. 5 is a relative luminance graph of the ultra-wide angle camera lens according to the first embodiment.
Figure 6:
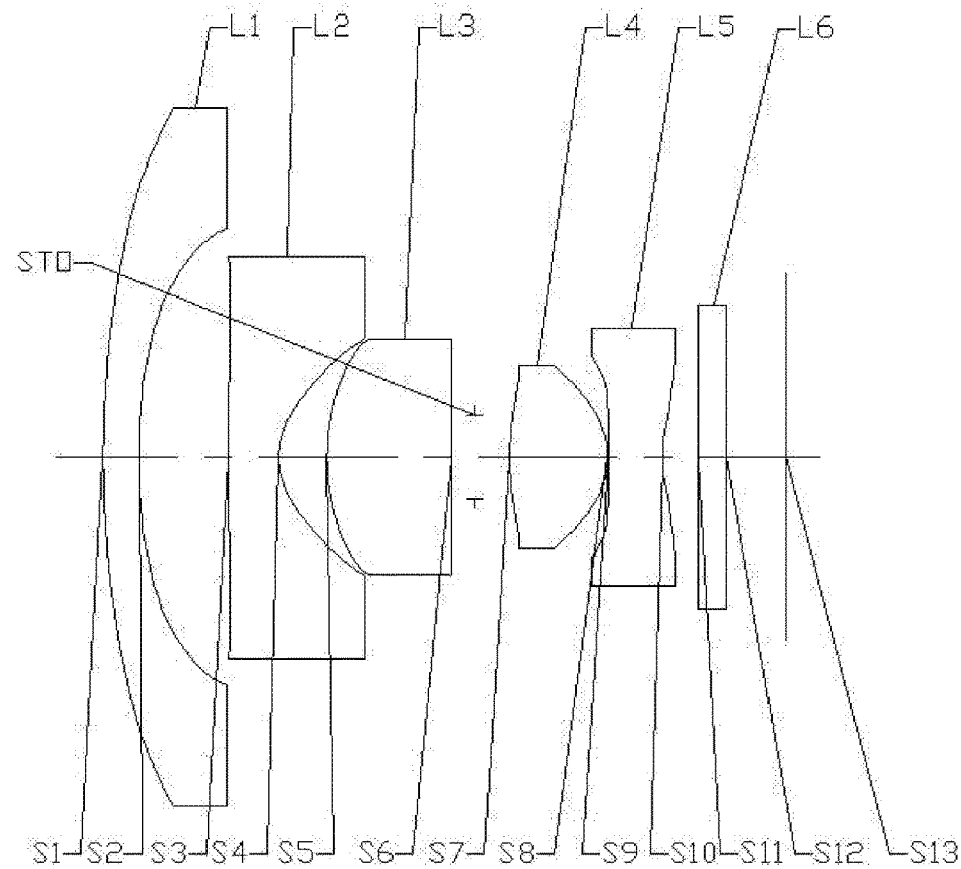
FIG. 6 is a schematic view of an ultra-wide angle camera lens according to a second embodiment.
Figure 7:
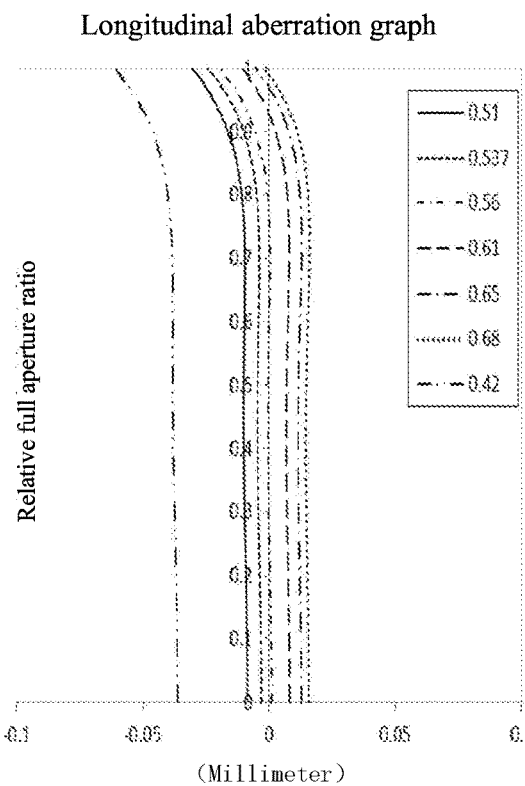
FIG. 7 is a longitudinal aberration graph (mm) of the ultra-wide angle camera lens according to the second embodiment.
Figure 8:
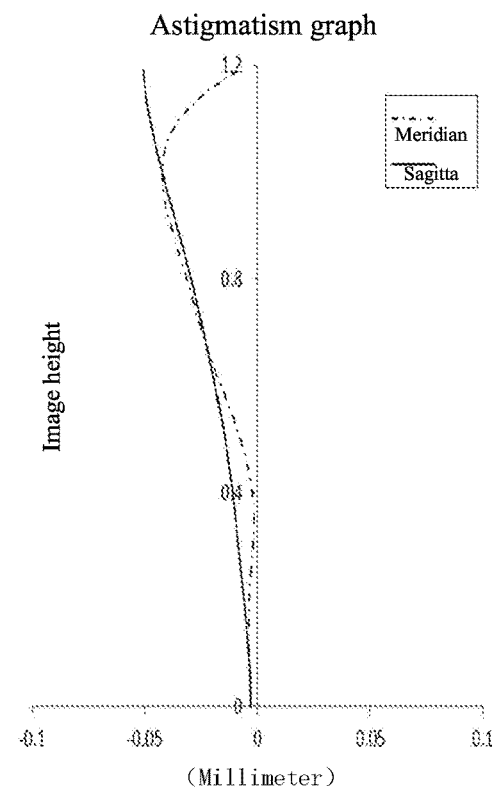
FIG. 8 is an astigmatism graph (mm) of the ultra-wide angle camera lens according to the second embodiment.
Figure 9:
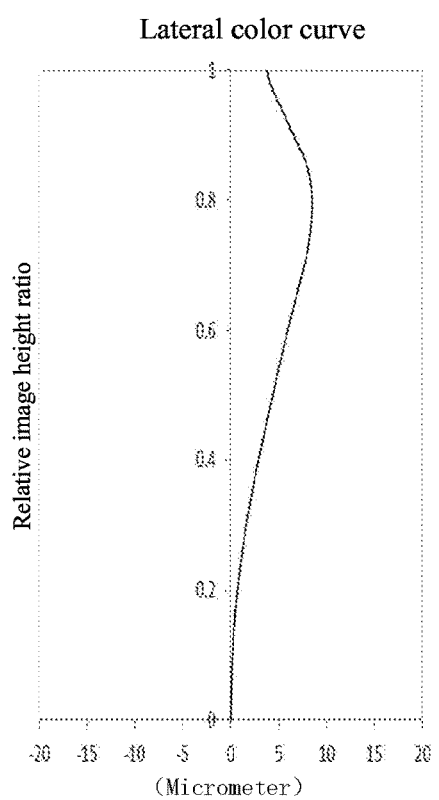
FIG. 9 is a graph (μm) of a lateral color curve of the ultra-wide angle camera lens according to the second embodiment.
Figure 10:
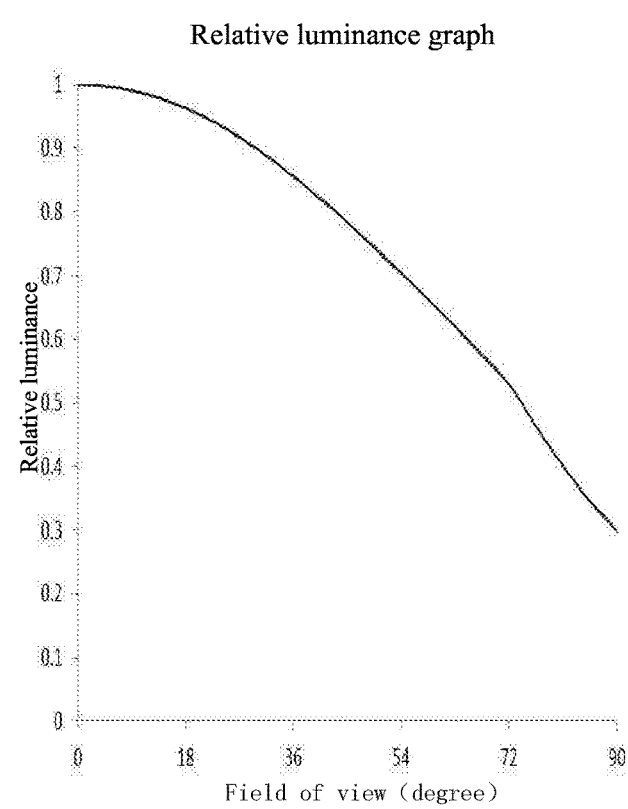
FIG. 10 is a relative luminance graph of the ultra-wide angle camera lens according to the second embodiment.
Figure 11:
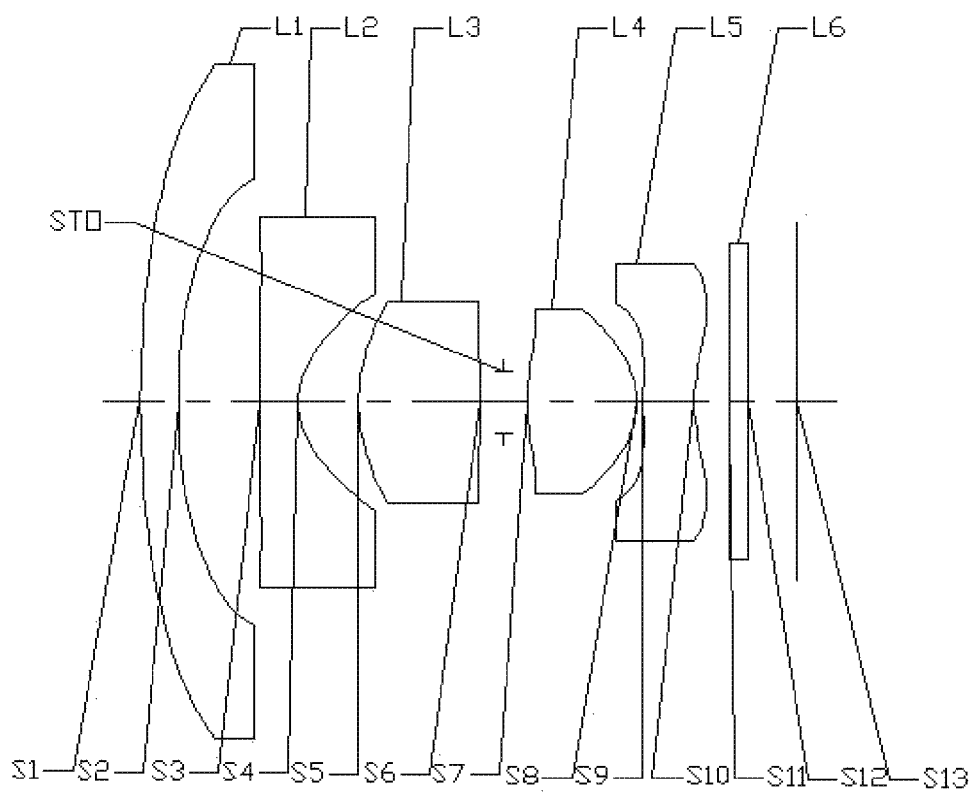
FIG. 11 is a schematic view of an ultra-wide angle camera lens according to a third embodiment.
Figure 12:
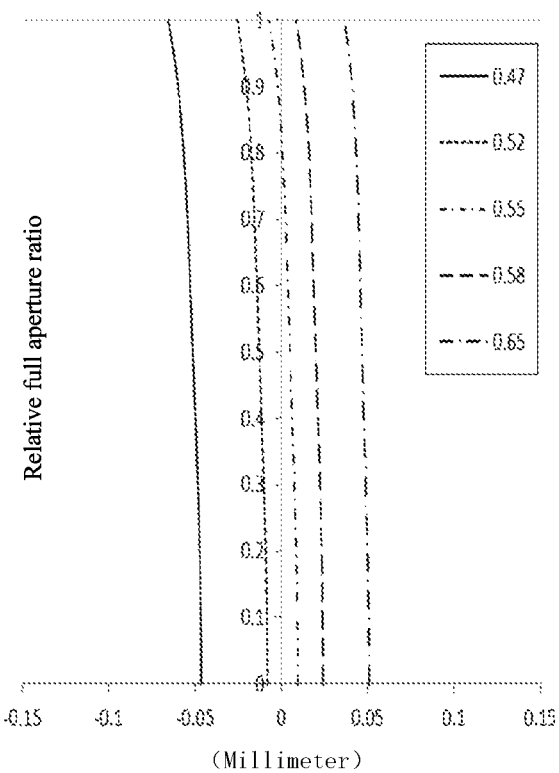
FIG. 12 is a longitudinal aberration graph (mm) of the ultra-wide angle camera lens according to the third embodiment.
Figure 13:
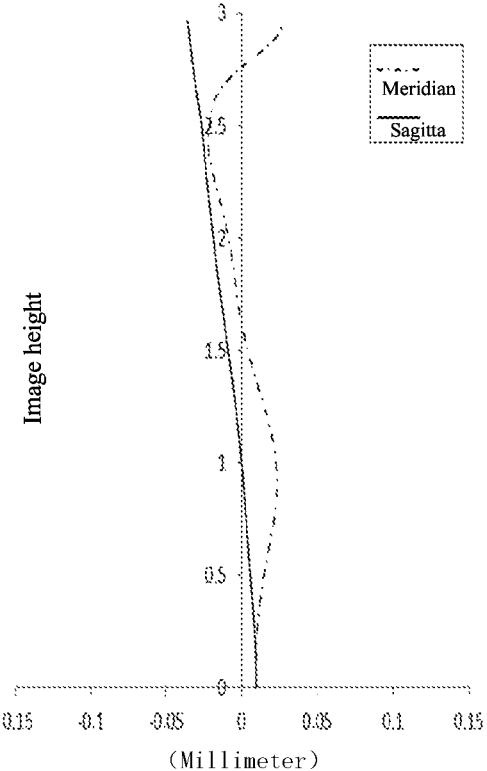
FIG. 13 is an astigmatism graph (mm) of the ultra-wide angle camera lens according to the third embodiment.
Figure 17:
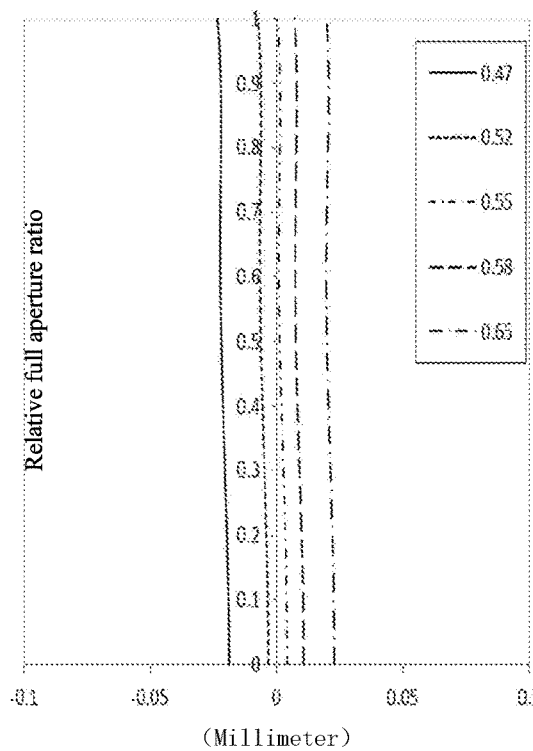
FIG. 17 is a longitudinal aberration graph (mm) of the ultra-wide angle camera lens according to the fourth embodiment.
Figure 18:
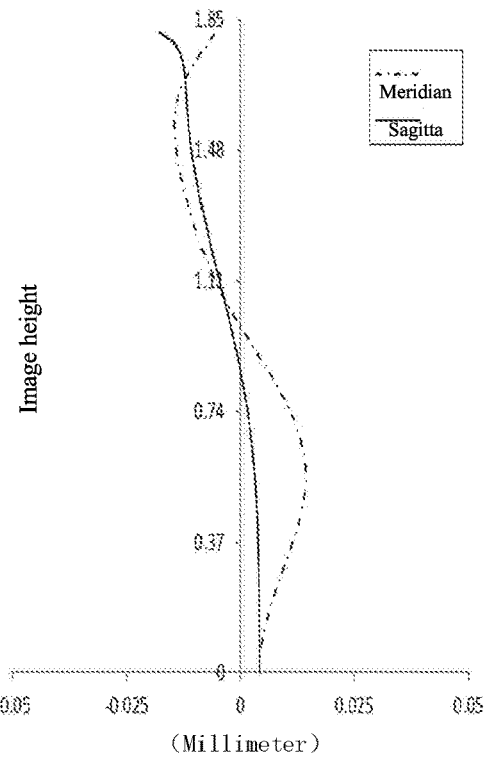
FIG. 18 is an astigmatism graph (mm) of the ultra-wide angle camera lens according to the fourth embodiment.
Figure 19:
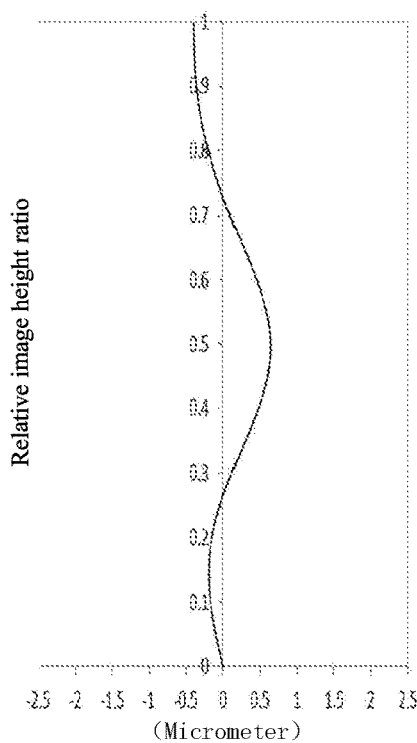
FIG. 19 is a graph (μm) of a lateral color curve of the ultra-wide angle camera lens according to the fourth embodiment.
Figure 20:
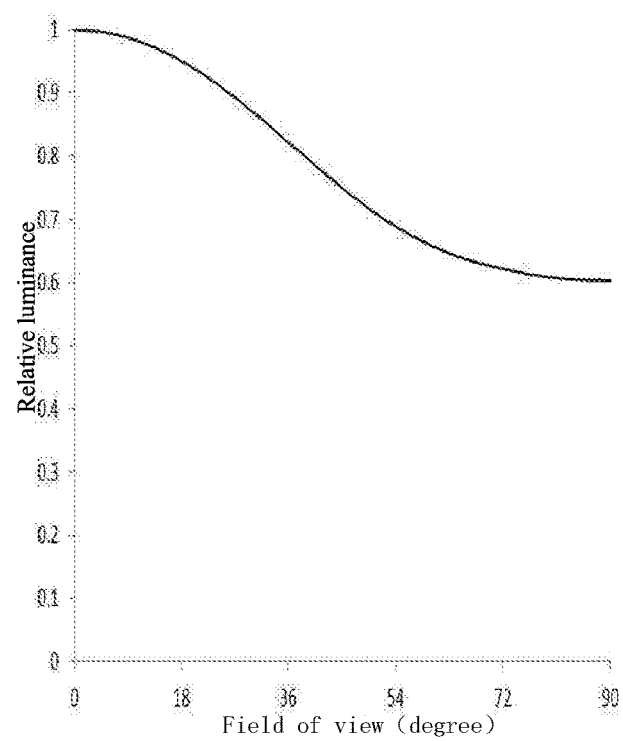
FIG. 20 is a relative luminance graph of the ultra-wide angle camera lens according to the fourth embodiment.
Figure 21:
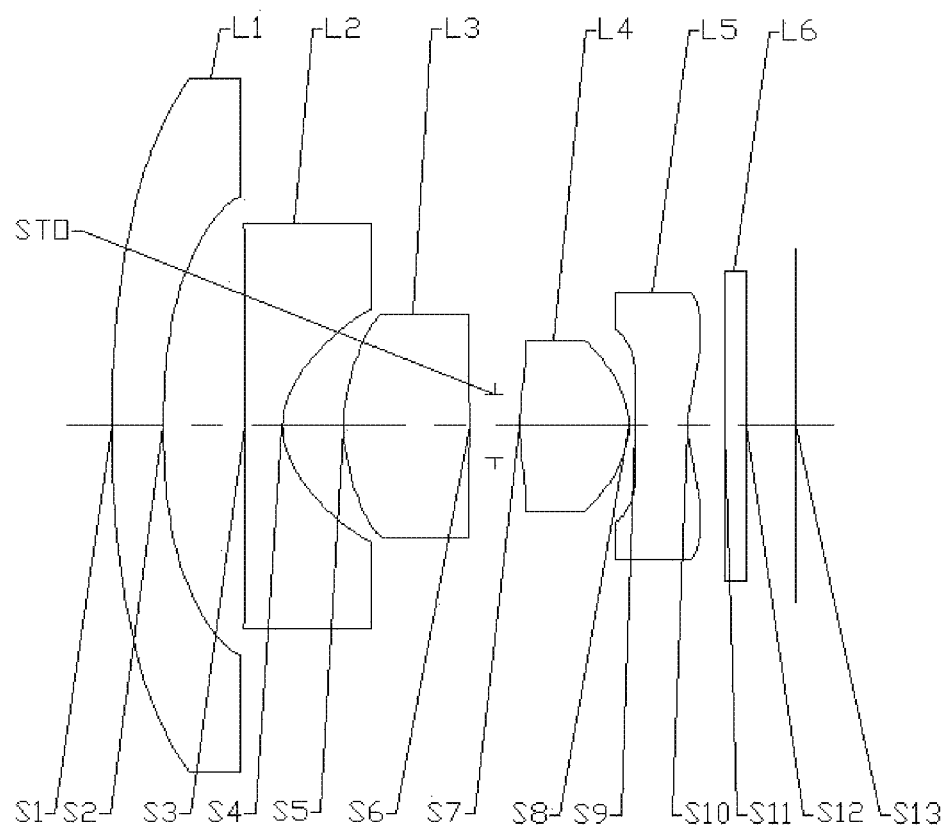
FIG. 21 is a schematic view of an ultra-wide angle camera lens according to a fifth embodiment.
Figure 22:
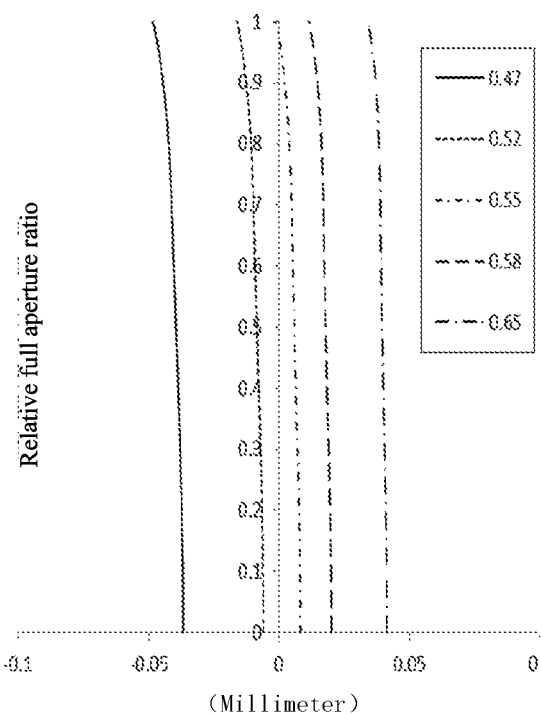
FIG. 22 is a longitudinal aberration graph (mm) of the ultra-wide angle camera lens according to the fifth embodiment.
Figure 23:
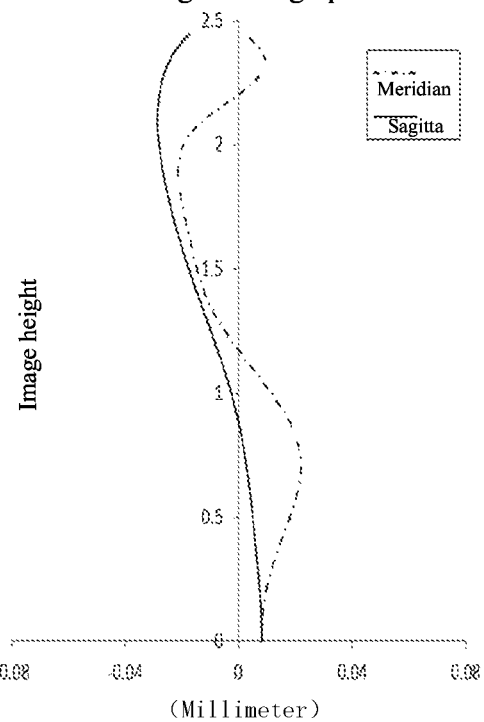
FIG. 23 is an astigmatism graph (mm) of the ultra-wide angle camera lens according to the fifth embodiment.
Figures 24, 25:
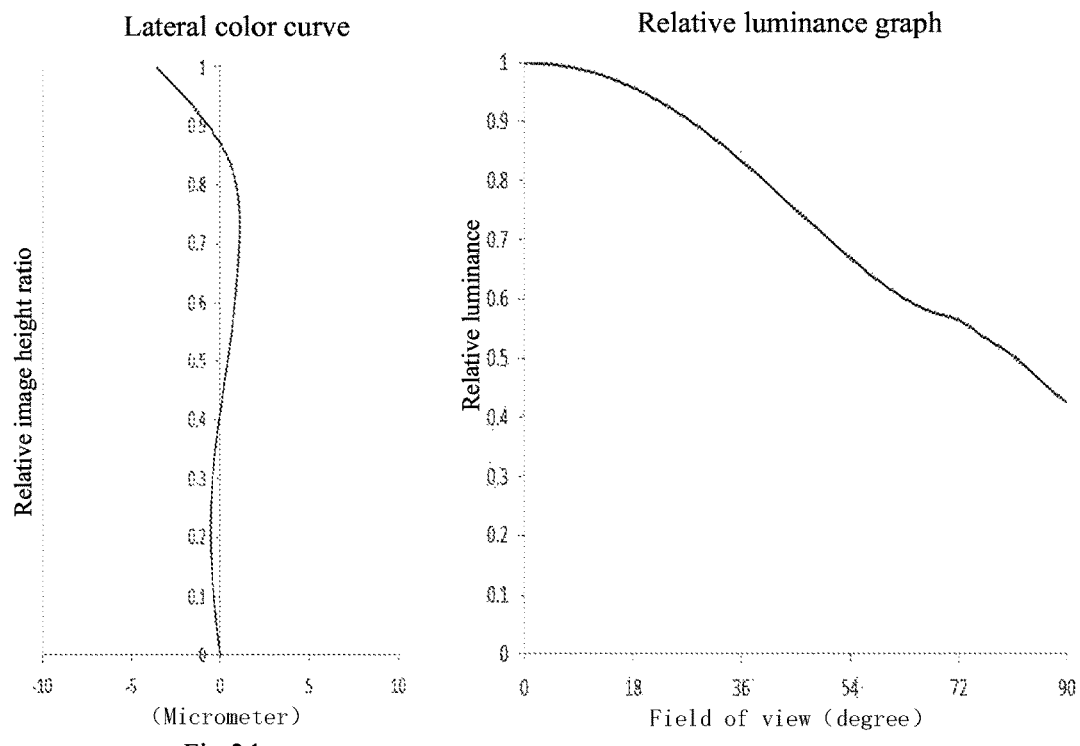
FIG. 24 is a graph (μm) of a lateral color curve of the ultra-wide angle camera lens according to the fifth embodiment.
FIG. 25 is a relative luminance graph of the ultra-wide angle camera lens according to the fifth embodiment.
Figure 26:
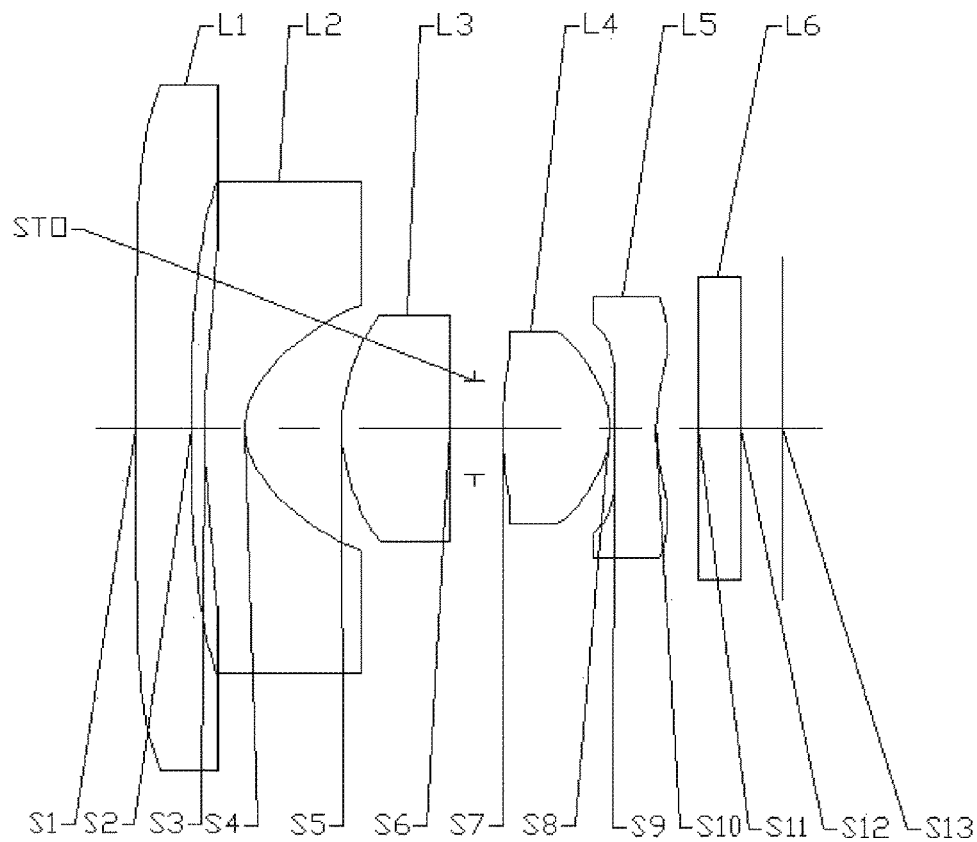
FIG. 26 is a schematic view of an ultra-wide angle camera lens according to a sixth embodiment.
Figure 27:
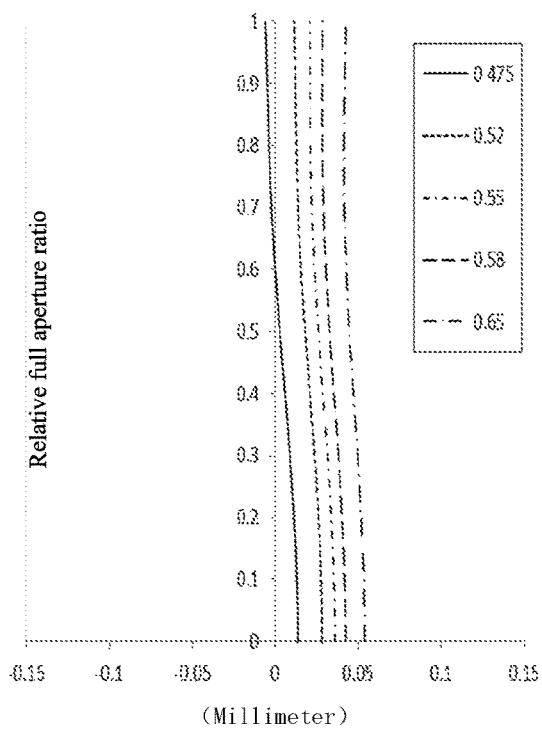
FIG. 27 is a longitudinal aberration graph (mm) of the ultra-wide angle camera lens according to the sixth embodiment.
Figure 28:
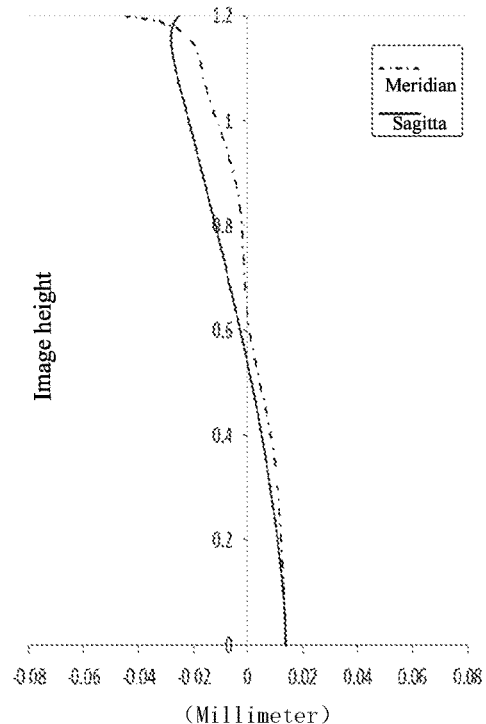
FIG. 28 is an astigmatism graph (mm) of the ultra-wide angle camera lens according to the sixth embodiment.
Figure 29:
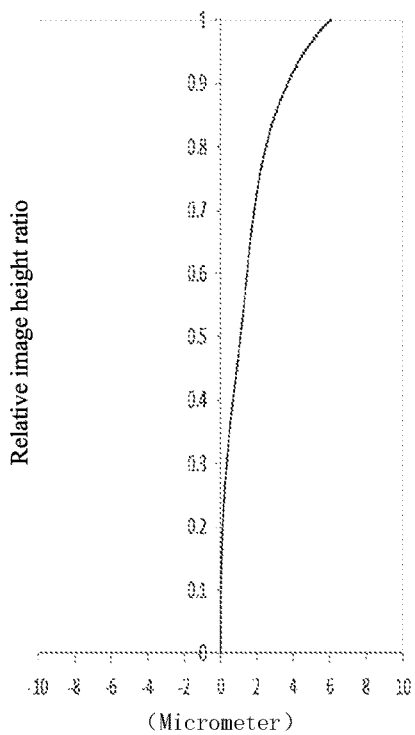
FIG. 29 is a graph (μm) of a lateral color curve of the ultra-wide angle camera lens according to the sixth embodiment.
Figure 30:
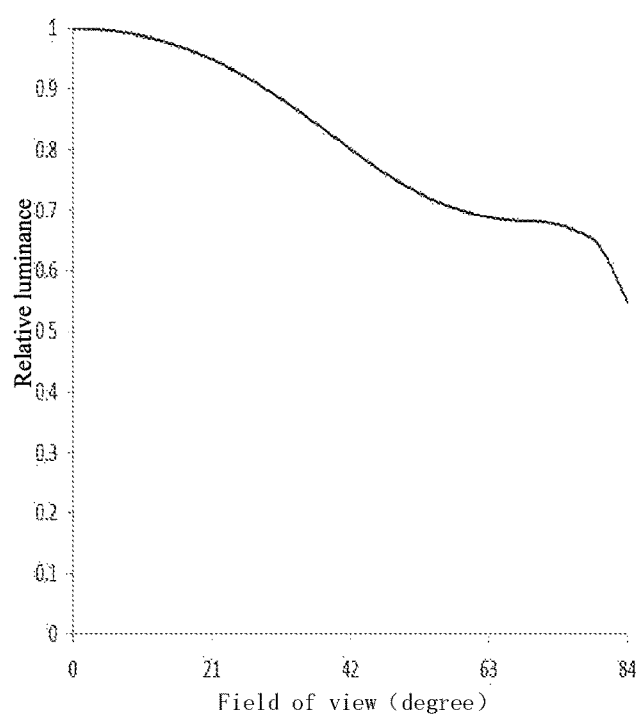
FIG. 30 is a relative luminance graph of the ultra-wide angle camera lens according to the sixth embodiment.
Figure 31:
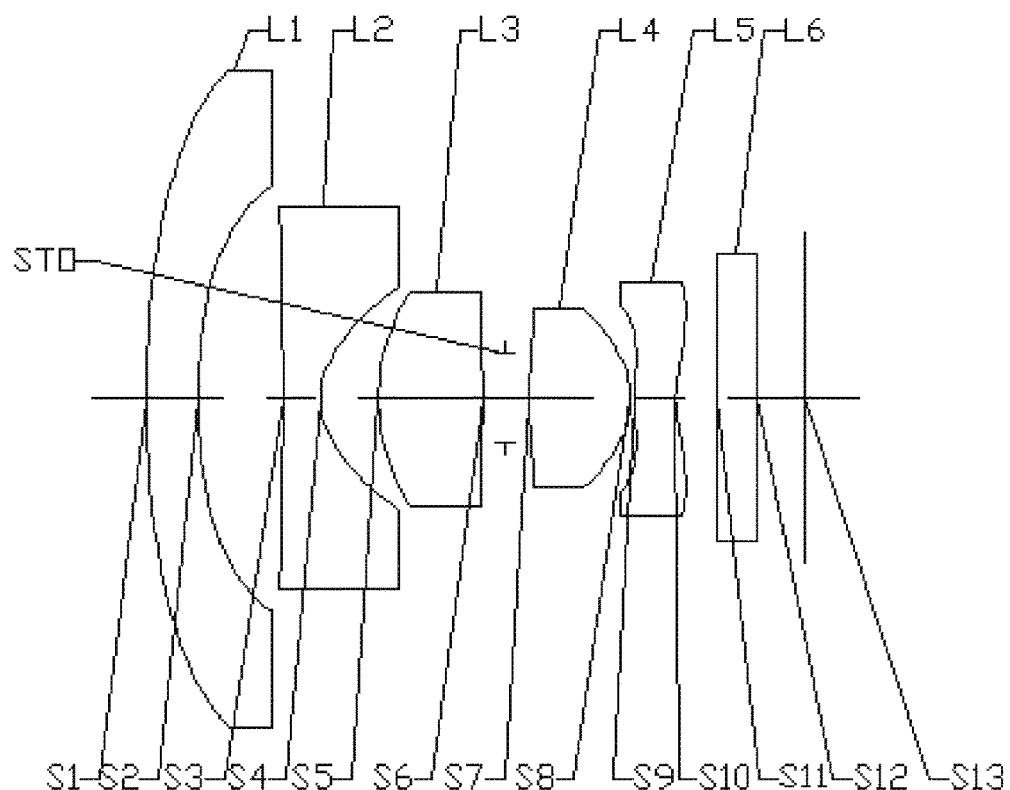
FIG. 31 is a schematic view of an ultra-wide angle camera lens according to a seventh embodiment.
Figure 32:
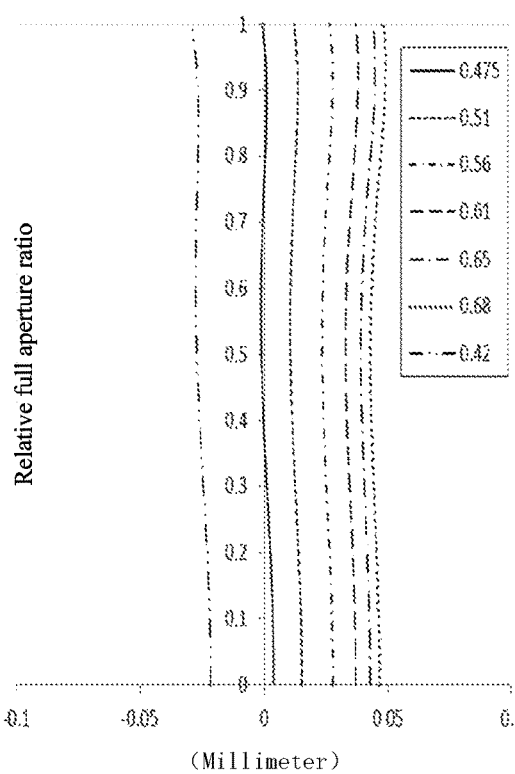
FIG. 32 is a longitudinal aberration graph (mm) of the ultra-wide angle camera lens according to the seventh embodiment.
Figure 33:
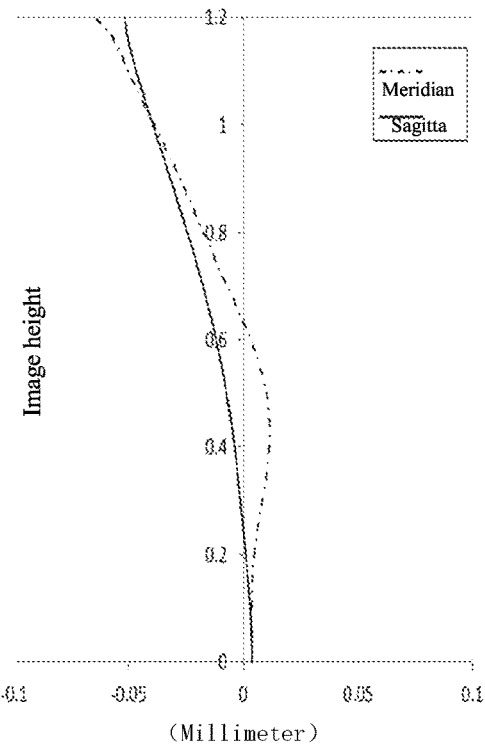
FIG. 33 is an astigmatism graph (mm) of the ultra-wide angle camera lens according to the seventh embodiment.
Figure 34:
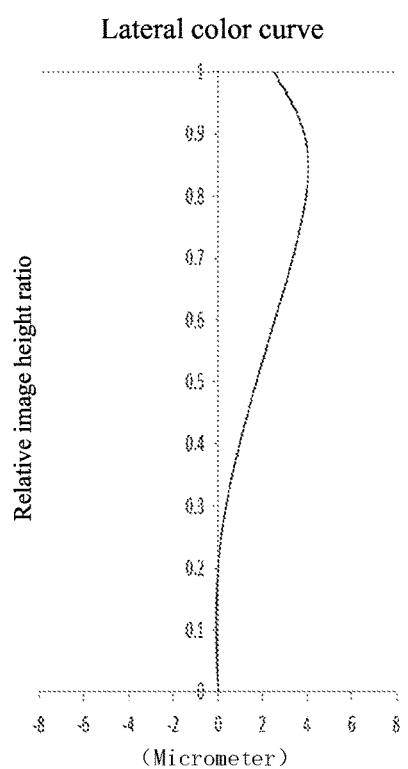
FIG. 34 is a graph (μm) of lateral color curve of the ultra-wide angle camera lens according to the seventh embodiment.
Figure 35:
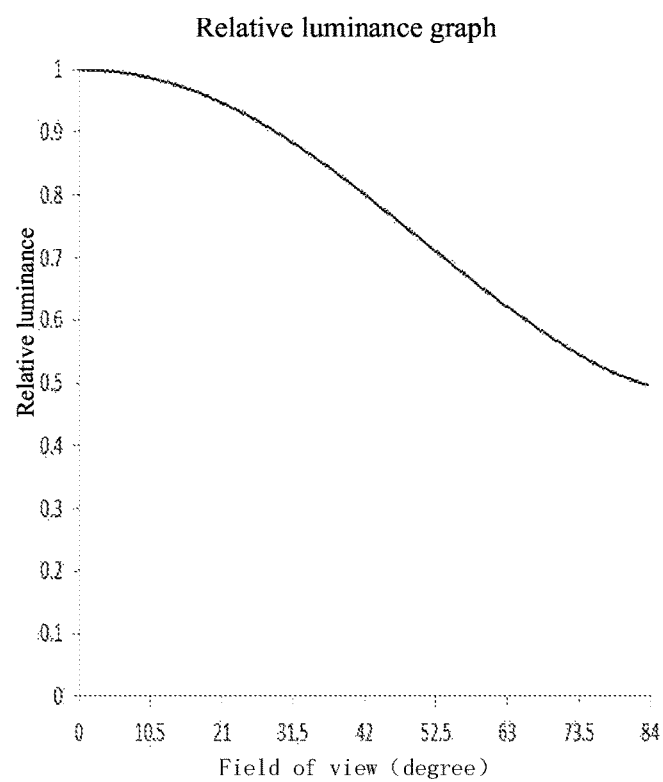
FIG. 35 is a relative luminance graph of the ultra-wide angle camera lens according to the seventh embodiment.
Figure 36:
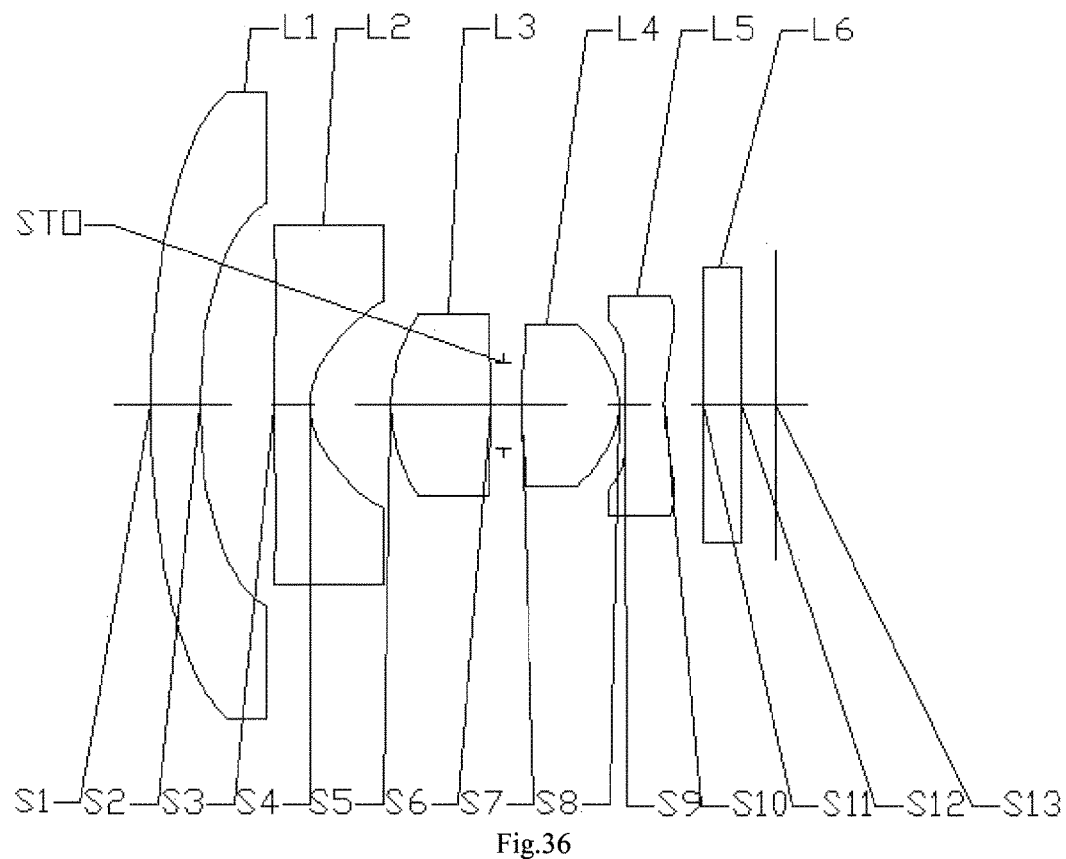
FIG. 36 is a schematic view of an ultra-wide angle camera lens according to an eighth embodiment.
Figure 41:
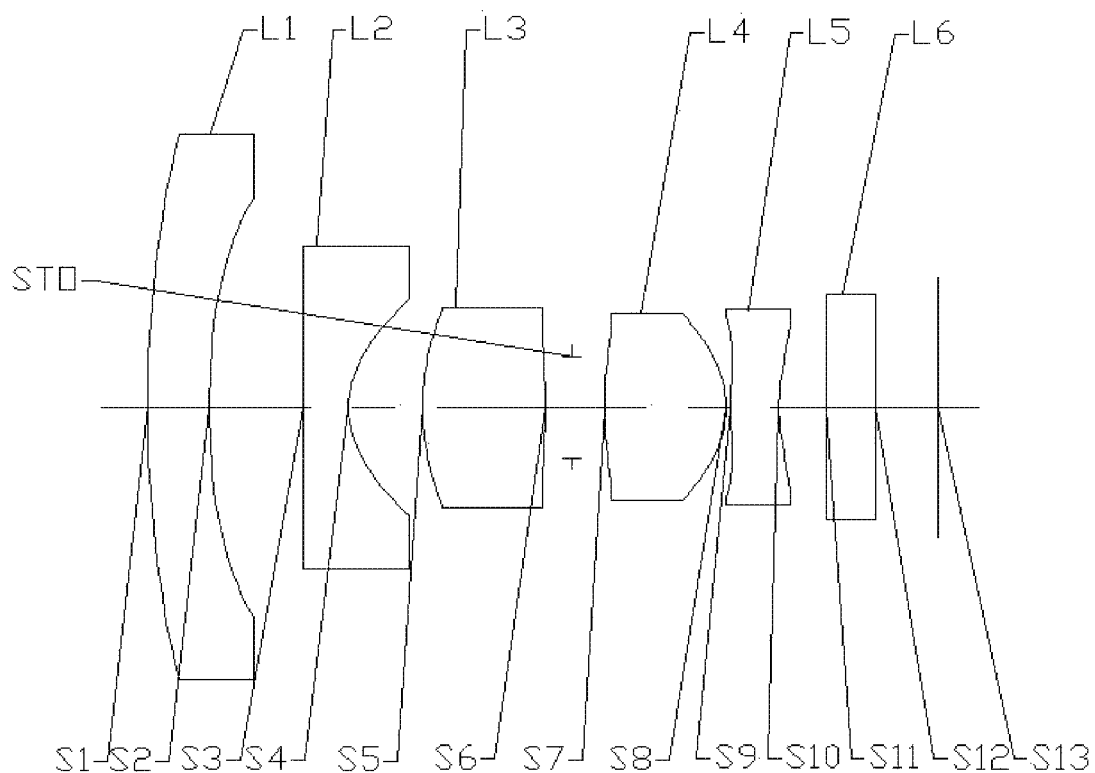
FIG. 41 is a schematic view of an ultra-wide angle camera lens according to a ninth embodiment.
Figure 42:
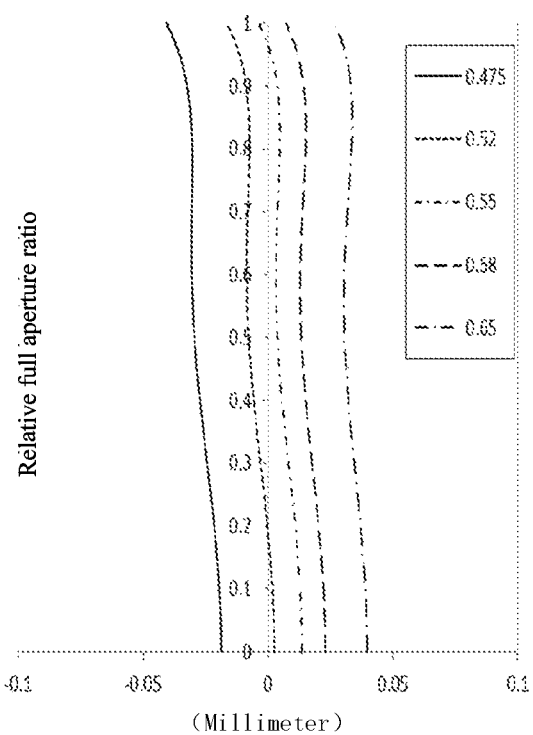
FIG. 42 is a longitudinal aberration graph (mm) of the ultra-wide angle camera lens according to the ninth embodiment.
Figure 43:
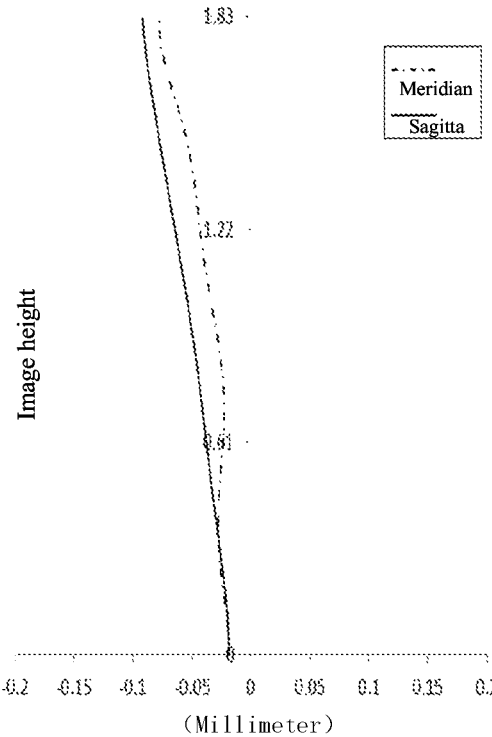
FIG. 43 is an astigmatism graph (mm) of the ultra-wide angle camera lens according to the ninth embodiment.

Reference will be made in detail to embodiments of the present disclosure, examples of the embodiments are shown in the drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present invention, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, from an object side to an image side, an ultra-wide angle camera lens according to a preferred embodiment of the present disclosure sequentially includes:

a first lens L1 with negative refractive power, an image-side face S2 of the first lens L1 being concave;

a second lens L2 with negative refractive power, an image-side face S4 of the second lens L2 being concave;

a third lens L3 with positive refractive power, an object-side face S5 of the third lens L3 being convex;

a fourth lens L4 with positive refractive power, an image-side face S8 of the fourth lens L4 being convex; and a fifth lens L5 with negative refractive power, an image-side face S10 of the fifth lens L5 being concave.

The ultra-wide angle camera lens satisfies the following relation: $-0.05<f/f1<0$ and $1.2<ImgH/f<2$, in which, f represents an effective focus length of the ultra-wide angle camera lens, f1 represents an effective focus length of the first lens L1, and ImgH is half of a diagonal line of an effective pixel region on an imaging face.

The ultra-wide angle camera lens satisfying the above configuration has an ultra-wide angle, a long depth of field and a wide coverage; can effectively correct various aberrations to smooth relative luminance; and can facilitate shortening a system length of the ultra-wide angle camera lens to ensure miniaturization of the ultra-wide angle camera lens.

Preferably, the ultra-wide angle camera lens satisfies the following relation: $-1.4<f2/f4<-0.7$ and $-1.5<f2/f<-1$, in which, f2 represents an effective focus length of the second lens L2, and f4 represents an effective focus length of the fourth lens L4.

The ultra-wide angle camera lens satisfying the above relation can correct aberrations and chromatic aberrations to improve imaging quality of the ultra-wide angle camera lens.

Preferably, the ultra-wide angle camera lens satisfies the following relation: $1<DT22/DT31<1.2$, and $1<DT31/DT52<1.35$, in which, DT22 represents an effective radius of the image-side face S4 of the second lens L2, DT31 represents an effective radius of the object-side face S5 of the third lens L3, and DT52 represents an effective radius of the image-side face S10 of the fifth lens L5.

The ultra-wide angle camera lens satisfying the above relation can adjust an incident angle of light in various fields, effectively avoid total reflection and further improve the imaging quality of the ultra-wide angle camera lens.

Preferably, the ultra-wide angle camera lens satisfies the following relation: $TTL/ImgH<4.6$, in which, TTL represents a distance between an object-side face S1 of the first lens L1 and an imaging face S13 along an axis.

The ultra-wide angle camera lens satisfying the above relation can facilitate shortening a system length of the ultra-wide angle camera lens to achieve miniaturization of the ultra-wide angle camera lens.

Preferably, the ultra-wide angle camera lens satisfies the following relation: $0<T34/TTL<0.1$, and $0.05<T23/TTL<0.16$, in which, T34 represents a spacing distance between the third lens L3 and the fourth lens L4 along the axis, TTL represents the distance between the object-side face S1 of the first lens L1 and the imaging face S13 along the axis, and T23 represents a spacing distance between the second lens L2 and the third lens L3 along the axis.

The ultra-wide angle camera lens satisfying the above relation can increase the luminous flux of the ultra-wide angle camera lens, and make the relative luminance smoother with no sudden reduction at margins.

Preferably, the ultra-wide angle camera lens satisfies the following relation: $0.4<\Sigma CT/TTL<0.6$, in which, $\Sigma CT$ represents a sum of thicknesses of the first lens L1, the second lens L2, the third lens L3, the fourth lens L4 and the fourth lens L5 along an optical axis, and TTL represents the distance between the object-side face of the first lens L1 and the imaging face S13 along the axis.

The ultra-wide angle camera lens satisfying the above relation can further ensure that the system length of the ultra-wide angle camera lens is short, to meet requirement of miniaturization of the ultra-wide angle camera lens.

Preferably, the ultra-wide angle camera lens satisfies the following relation: $0.6<CT1/CT5<1.35$, and $0.65<CT2/CT5<1$, in which, CT1 represents a central thicknesses of the first lens L1 along the optical axis, CT2 represents a central thicknesses of the second lens L2 along the optical axis, and CT5 represents a central thicknesses of the fifth lens L5 along the optical axis.

The ultra-wide angle camera lens satisfying the above relation can make a lens has a uniform thickness, which can reduce sensibility of the ultra-wide angle camera lens and facilitate manufacturing.

Preferably, the ultra-wide angle camera lens satisfies the following relation: $1<R1/R2<1.5$, in which, R1 represents a radius of curvature of the object-side face S1 of the first lens L1, and R2 represents a radius of curvature of an object-side face S3 of the second lens L2.

The ultra-wide angle camera lens satisfying the above relation can make it easy to manufacture a lens, thus reducing a manufacturing cost of the ultra-wide angle camera lens and meeting the low cost requirement of the ultra-wide angle camera lens.

Preferably, an image-side face S6 of the third lens L3 is convex, and an object-side face S7 of the fourth lens L4 is convex.

The ultra-wide angle camera lens satisfying the above relation can further correct aberrations and improve the imaging quality of the ultra-wide angle camera lens.

During formation of an image, light penetrates five lenses, passes an optical filter having an object-side surface S11 and an image-side surface S12, and forms an image on the imaging face S13.

In some embodiments, the first lens L1, the second lens L2, the third lens L3, the forth lens L4 and the fifth lens L5 are all configured as aspherical lenses.

A surface shape of an aspherical surface is determined based on the following formula:

$$x = \frac{ch^2}{1 + \sqrt{1 - (k+1)c^2h^2}} + \sum A_i h^i,$$

in which, h represents a height from any point on the aspheric surface to the optical axis, c represents a curvature of an apex, k represents a conic constant, and Ai represents a correction factor of an i-th order of the aspherical surface.

The First Embodiment

Referring to FIG. 1 to FIG. 5, an ultra-wide angle camera lens according to the first embodiment satisfies conditions in table 1 to table 3.

TABLE 1

| Face numeral | Type of surface | Radius of curvature | Thickness | Material | Conic constant |
|---|---|---|---|---|---|
| OBJ | spherical surface | infinity | infinity | — | — |
| S1 | aspheric surface | 7.3802 | 0.3880 | 1.535/55.78 | 6.6262 |
| S2 | aspheric surface | 5.2536 | 0.5870 | — | 9.6075 |
| S3 | aspheric surface | 94.7000 | 0.2780 | 1.535/55.78 | −998.9662 |
| S4 | aspheric surface | 0.5744 | 0.4627 | — | −0.8161 |
| S5 | aspheric surface | 1.4647 | 0.7660 | 1.636/23.78 | 0.0183 |
| S6 | aspheric surface | −4.2400 | 0.1670 | — | −118.4032 |
| STO | spherical surface | infinity | 0.2026 | — | — |
| S7 | aspheric surface | 2.2781 | 0.7580 | 1.535/55.78 | 11.4886 |
| S8 | aspheric surface | −0.5545 | 0.0319 | — | −2.8831 |
| S9 | aspheric surface | 6.2537 | 0.2960 | 1.636/23.78 | 55.6042 |
| S10 | aspheric surface | 1.0327 | 0.3000 | — | −14.7630 |
| S11 | spherical surface | infinity | 0.3000 | 1.517/64.17 | — |
| S12 | spherical surface | infinity | 0.3948 | — | — |
| S13 | spherical surface | infinity | — | — | — |

TABLE 2

The following table shows aspheric surface high-order coefficients A4, A6, A8 and A10 of aspheric lenses:

| Face numeral | A4 | A6 | A8 | A10 |
|---|---|---|---|---|
| S1 | −4.8603E−03 | 8.1846E−04 | −8.6812E−08 | −5.1292E−06 |
| S2 | 3.5651E−02 | −1.1351E−02 | 2.7237E−03 | −2.4824E−04 |
| S3 | −5.4003E−03 | −7.0795E−04 | 3.8303E−05 | −1.1424E−04 |
| S4 | −2.1283E−01 | −4.5992E−02 | 7.0486E−02 | 8.7880E−02 |
| S5 | −1.2636E−01 | 1.8145E−02 | 1.3520E−01 | 2.0869E−01 |
| S6 | −5.6880E−02 | 9.4303E−01 | −1.4746E+00 | 1.9862E+00 |
| S7 | −1.4521E−01 | −1.2406E+00 | 4.3552E+00 | −8.1944E+00 |
| S8 | −3.8405E−01 | −2.8437E−01 | 1.8469E−01 | 1.0871E−02 |
| S9 | −4.7989E−01 | −2.6839E−01 | −5.5823E−01 | 6.9740E−02 |
| S10 | −2.2109E−01 | −1.6921E−02 | 6.5996E−02 | −5.2172E−02 |

TABLE 3

| f1 (mm) | −36.20 | f (mm) | 0.83 |
|---|---|---|---|
| f2 (mm) | −1.08 | Fno | 2 |
| f3 (mm) | 1.79 | TTL (mm) | 4.93 |
| f4 (mm) | 0.91 | | |
| f5 (mm) | −1.97 | | |

The Second Embodiment

Referring to FIG. 6 to FIG. 10, an ultra-wide angle camera lens according to the second embodiment satisfies conditions in table 4 to table 6.

TABLE 4

| Face numeral | Type of surface | Radius of curvature | Thickness | Material | Conic constant |
|---|---|---|---|---|---|
| OBJ | spherical surface | infinity | infinity | — | — |
| S1 | aspheric surface | 7.5629 | 0.2632 | 1.535/55.78 | 6.5176 |

TABLE 4-continued

| Face numeral | Type of surface | Radius of curvature | Thickness | Material | Conic constant |
|---|---|---|---|---|---|
| S2 | aspheric surface | 5.4967 | 0.6361 | — | 9.9676 |
| S3 | aspheric surface | 26.4603 | 0.3651 | 1.535/55.78 | 132.1950 |
| S4 | aspheric surface | 0.5347 | 0.3487 | — | −0.8544 |
| S5 | aspheric surface | 1.4570 | 0.9039 | 1.636/23.78 | 0.1992 |
| S6 | aspheric surface | −4.9018 | 0.1679 | — | −200.1445 |
| STO | spherical surface | infinity | 0.2462 | — | — |
| S7 | aspheric surface | 2.0280 | 0.7090 | 1.535/55.78 | 8.9253 |
| S8 | aspheric surface | −0.5226 | 0.0010 | — | −2.4004 |
| S9 | aspheric surface | 6.7101 | 0.3945 | 1.636/23.78 | 70.4698 |
| S10 | aspheric surface | 1.0378 | 0.2559 | — | −13.7160 |
| S11 | spherical surface | infinity | 0.2100 | 1.517/64.17 | — |
| S12 | spherical surface | infinity | 0.4265 | — | — |
| S13 | spherical surface | infinity | — | — | — |

TABLE 5

The following table shows aspheric surface high-order term coefficients A4, A6, A8, A10, A12, A14 and A16 of aspheric lenses:

| Face numeral | A4 | A6 | A8 | A10 | A12 | A14 | A16 |
|---|---|---|---|---|---|---|---|
| S1 | −4.5850E−03 | 7.9852E−04 | −1.3886E−05 | −7.9085E−06 | 0 | 0 | 0 |
| S2 | 3.8524E−02 | −1.2427E−02 | 3.5297E−03 | −2.8610E−04 | 0 | 0 | 0 |
| S3 | −5.7684E−03 | −1.0413E−03 | −4.2754E−05 | −8.2578E−05 | 0 | 0 | 0 |
| S4 | −3.1782E−01 | −8.3574E−02 | 6.0233E−02 | 1.8671E−01 | 0 | 0 | 0 |
| S5 | −1.2753E−01 | 3.9622E−02 | 1.2266E−01 | 1.6103E−01 | 0 | 0 | 0 |
| S6 | −1.0514E−01 | −2.0423E+00 | 6.8634E+00 | −1.0454E+01 | 0 | 0 | 0 |
| S7 | 1.3335E−01 | 9.7636E−01 | −2.0646E+00 | 2.4742E+00 | 0 | 0 | 0 |
| S8 | −4.6046E−01 | −3.2240E−01 | 3.6731E−01 | 5.1311E−01 | 0 | 0 | 0 |
| S9 | −5.5064E−01 | −2.1968E−01 | −4.1543E−01 | 1.0591E+00 | 1.3688E+00 | 6.9149E−01 | −6.3254E+00 |
| S10 | −2.4092E−01 | 6.7947E−02 | 1.4391E−01 | −5.5582E−02 | −9.1222E−03 | −2.0539E−02 | −2.0533E−02 |

TABLE 6

| f1 (mm) | −39.14 | f (mm) | 0.76 |
|---|---|---|---|
| f2 (mm) | −1.02 | Fno | 2.08 |
| f3 (mm) | 1.85 | TTL (mm) | 4.92 |
| f4 (mm) | 0.86 | | |
| f5 (mm) | −1.96 | | |

The Third Embodiment

Referring to FIG. 11 to FIG. 15, an ultra-wide angle camera lens according to the third embodiment satisfies conditions in table 7 to table 9.

TABLE 7

| Face numeral | Type of surface | Radius of curvature | Thickness | Material | Conic constant |
|---|---|---|---|---|---|
| OBJ | spherical surface | infinity | infinity | — | — |
| S1 | aspheric surface | 18.1153 | 0.6690 | 1.535/55.78 | 6.6469 |
| S2 | aspheric surface | 12.7831 | 1.4337 | — | 9.5218 |
| S3 | aspheric surface | 98.9415 | 0.6567 | 1.535/55.78 | 106.1499 |
| S4 | aspheric surface | 1.2675 | 1.0655 | — | −0.8319 |
| S5 | aspheric surface | 3.0018 | 2.1353 | 1.636/23.78 | −0.0025 |
| S6 | aspheric surface | −10.5159 | 0.4070 | — | −148.4322 |
| STO | spherical surface | infinity | 0.4256 | — | — |
| S7 | aspheric surface | 5.0759 | 1.9120 | 1.535/55.78 | 12.3371 |
| S8 | aspheric surface | −1.2894 | 0.1139 | — | −2.5694 |
| S9 | aspheric surface | 15.4825 | 0.8836 | 1.636/23.78 | 64.2337 |
| S10 | aspheric surface | 2.1705 | 0.6150 | — | −10.0874 |
| S11 | spherical surface | infinity | 0.3431 | 1.517/64.17 | — |
| S12 | spherical surface | infinity | 0.8632 | — | — |
| S13 | spherical surface | infinity | — | — | — |

TABLE 8

The following table shows aspheric surface high-order term coefficients A4, A6, A8, A10, A12, A14 and A16 of aspheric lenses:

| Face numeral | A4 | A6 | A8 | A10 | A12 | A14 | A16 |
|---|---|---|---|---|---|---|---|
| S1 | −3.2842E−04 | 1.3012E−05 | −1.3194E−08 | −3.0801E−09 | 0 | 0 | 0 |
| S2 | 2.4562E−03 | −1.8163E−04 | 1.0011E−05 | −2.4786E−07 | 0 | 0 | 0 |
| S3 | −3.8415E−04 | −9.4799E−06 | 5.9415E−08 | −4.4577E−08 | 0 | 0 | 0 |
| S4 | −1.9935E−02 | −8.2930E−04 | 1.7894E−04 | 5.5417E−05 | 0 | 0 | 0 |
| S5 | −9.7063E−03 | 1.0792E−04 | 2.4345E−04 | 7.8426E−05 | 0 | 0 | 0 |
| S6 | −8.2865E−05 | 1.2565E−02 | −9.4737E−03 | 3.8586E−03 | 0 | 0 | 0 |
| S7 | −1.2747E−02 | −2.1625E−02 | 1.6023E−02 | −6.4181E−03 | 0 | 0 | 0 |
| S8 | −3.1441E−02 | −4.0773E−03 | 7.5980E−04 | 1.3467E−04 | 0 | 0 | 0 |
| S9 | −4.4038E−02 | −4.2553E−03 | −1.5530E−03 | 6.8370E−05 | 1.2311E−05 | 4.6256E−06 | 2.1033E−07 |
| S10 | −1.7437E−02 | −2.0220E−04 | 1.8547E−04 | −2.7150E−05 | 8.4572E−09 | 2.5279E−08 | 5.4667E−09 |

TABLE 9

| | | | |
|---|---|---|---|
| f1 (mm) | −84.56 | f (mm) | 1.84 |
| f2 (mm) | −2.40 | Fno | 2.81 |
| f3 (mm) | 3.88 | TTL (mm) | 11.52 |
| f4 (mm) | 2.14 | | |
| f5 (mm) | −4.04 | | |

The Fourth Embodiment

Referring to FIG. 16 to FIG. 20, an ultra-wide angle camera lens according to the fourth embodiment satisfies conditions in table 10 to table 12.

TABLE 10

| Face numeral | Type of surface | Radius of curvature | Thickness | Material | Conic constant |
|---|---|---|---|---|---|
| OBJ | spherical surface | infinity | 0.2000 | — | — |
| S1 | aspheric surface | 12.7238 | 0.5697 | 1.535/55.78 | 4.5869 |
| S2 | aspheric surface | 9.3395 | 0.8942 | — | 10.6547 |
| S3 | aspheric surface | 233.6083 | 0.4533 | 1.535/55.78 | 116.2678 |
| S4 | aspheric surface | 0.8883 | 0.6776 | — | −0.9006 |
| S5 | aspheric surface | 2.1560 | 1.5719 | 1.689/31.16 | −0.4179 |
| S6 | aspheric surface | −13.2334 | 0.4751 | — | −320.3890 |
| STO | spherical surface | infinity | 0.3411 | — | — |
| S7 | aspheric surface | 3.3478 | 1.1720 | 1.592/67.02 | 10.5550 |
| S8 | aspheric surface | −1.1000 | 0.0798 | — | −2.5329 |
| S9 | aspheric surface | 11.2925 | 0.6665 | 1.640/23.53 | 99.3826 |
| S10 | aspheric surface | 1.7429 | 0.4308 | — | −6.6024 |
| S11 | spherical surface | infinity | 0.2100 | 1.517/64.17 | — |
| S12 | spherical surface | infinity | 0.7281 | — | — |
| S13 | spherical surface | infinity | — | — | — |

TABLE 11

The following table shows aspheric surface high-order term coefficients A4, A6, A8, A10, A12, A14 and A16 of aspheric lenses:

| Face numeral | A4 | A6 | A8 | A10 | A12 | A14 | A16 |
|---|---|---|---|---|---|---|---|
| S1 | −1.4662E−03 | 4.7233E−05 | −9.9182E−07 | −3.2269E−08 | 0 | 0 | 0 |
| S2 | 7.2496E−03 | −8.7385E−04 | 1.2625E−04 | −7.1338E−06 | 0 | 0 | 0 |
| S3 | −1.8153E−03 | −1.1709E−04 | 4.0043E−06 | 2.1267E−06 | 0 | 0 | 0 |
| S4 | −7.8779E−02 | −1.1764E−02 | 3.5655E−04 | 4.4488E−04 | 0 | 0 | 0 |
| S5 | −3.4953E−02 | −2.9353E−03 | 8.9137E−04 | −1.5944E−05 | 0 | 0 | 0 |
| S6 | 3.9740E−03 | 5.8971E−02 | −6.3186E−02 | 3.9658E−02 | 0 | 0 | 0 |
| S7 | −5.0849E−02 | −1.3318E−01 | 1.8889E−01 | −1.6914E−01 | 0 | 0 | 0 |
| S8 | −9.0868E−02 | −9.0406E−03 | 9.7977E−03 | −6.2653E−03 | 0 | 0 | 0 |
| S9 | −1.3129E−01 | −1.2624E−02 | −9.3369E−03 | 9.6198E−03 | 3.0305E−03 | −6.7968E−04 | −2.3652E−03 |
| S10 | −4.4672E−02 | 1.3528E−03 | 3.0792E−03 | −4.6904E−04 | −1.1402E−04 | −4.3342E−05 | 3.3781E−05 |

TABLE 12

| f1 (mm) | −69.46 | f (mm) | 1.36 |
|---|---|---|---|
| f2 (mm) | −1.66 | Fno | 2.80 |
| f3 (mm) | 2.79 | TTL (mm) | 8.27 |
| f4 (mm) | 1.55 | | |
| f5 (mm) | −3.28 | | |

The Fifth Embodiment

Referring to FIG. 21 to FIG. 25, an ultra-wide angle camera lens according to the fifth embodiment satisfies conditions in table 13 to table 15.

TABLE 13

| Face numeral | Type of surface | Radius of curvature | Thickness | Material | Conic constant |
|---|---|---|---|---|---|
| OBJ | spherical surface | infinity | infinity | — | — |
| S1 | aspheric surface | 12.7238 | 0.5697 | 1.535/55.78 | 4.5869 |
| S2 | aspheric surface | 9.3395 | 0.8942 | — | 10.6547 |
| S3 | aspheric surface | 233.6083 | 0.4533 | 1.535/55.78 | 116.2678 |
| S4 | aspheric surface | 0.8883 | 0.6776 | — | −0.9006 |
| S5 | aspheric surface | 2.1560 | 1.5719 | 1.689/31.16 | −0.4179 |
| S6 | aspheric surface | −13.2334 | 0.4751 | — | −320.3890 |
| STO | spherical surface | infinity | 0.3411 | — | — |
| S7 | aspheric surface | 3.3478 | 1.1720 | 1.592/67.02 | 10.5550 |
| S8 | aspheric surface | −1.1000 | 0.0798 | — | −2.5329 |
| S9 | aspheric surface | 11.2925 | 0.6665 | 1.640/23.53 | 99.3826 |
| S10 | aspheric surface | 1.7429 | 0.4308 | — | −6.6024 |
| S11 | spherical surface | infinity | 0.2100 | 1.517/64.17 | — |
| S12 | spherical surface | infinity | 0.7281 | — | — |
| S13 | spherical surface | infinity | — | — | — |

TABLE 14

The following table shows aspheric surface high-order term coefficients A4, A6, A8, A10, A12, A14 and A16 of aspheric lenses:

| Face numeral | A4 | A6 | A8 | A10 | A12 | A14 | A16 |
|---|---|---|---|---|---|---|---|
| S1 | −1.4662E−03 | 4.7233E−05 | −9.9182E−07 | −3.2269E−08 | 0 | 0 | 0 |
| S2 | 7.2496E−03 | −8.7385E−04 | 1.2625E−04 | −7.1338E−06 | 0 | 0 | 0 |
| S3 | −1.8153E−03 | −1.1709E−04 | 4.0043E−06 | 2.1267E−06 | 0 | 0 | 0 |
| S4 | −7.8779E−02 | −1.1764E−02 | 3.5655E−04 | 4.4488E−04 | 0 | 0 | 0 |
| S5 | −3.4953E−02 | −2.9353E−03 | 8.9137E−04 | −1.5944E−05 | 0 | 0 | 0 |
| S6 | 3.9740E−03 | 5.8971E−02 | −6.3186E−02 | 3.9658E−02 | 0 | 0 | 0 |
| S7 | −5.0849E−02 | −1.3318E−01 | 1.8889E−01 | −1.6914E−01 | 0 | 0 | 0 |
| S8 | −9.0868E−02 | −9.0406E−03 | 9.7977E−03 | −6.2653E−03 | 0 | 0 | 0 |
| S9 | −1.3129E−01 | −1.2624E−02 | −9.3369E−03 | 9.6198E−03 | 3.0305E−03 | −6.7968E−04 | −2.3652E−03 |
| S10 | −4.4672E−02 | 1.3528E−03 | 3.0792E−03 | −4.6904E−04 | −1.1402E−04 | −4.3342E−05 | 3.3781E−05 |

TABLE 15

| f1 (mm) | −71.46 | f (mm) | 1.51 |
|---|---|---|---|
| f2 (mm) | −1.97 | Fno | 2.80 |
| f3 (mm) | 3.20 | TTL (mm) | 9.53 |
| f4 (mm) | 1.75 | | |
| f5 (mm) | −3.41 | | |

The Sixth Embodiment

Referring to FIG. 26 to FIG. 30, an ultra-wide angle camera lens according to the sixth embodiment satisfies conditions in table 16 to table 18.

TABLE 16

| Face numeral | Type of surface | Radius of curvature | Thickness | Material | Conic constant |
|---|---|---|---|---|---|
| OBJ | spherical surface | infinity | infinity | — | — |
| S1 | aspheric surface | −10000.0000 | 0.3880 | 1.535/55.78 | 100.0000 |

TABLE 16-continued

| Face numeral | Type of surface | Radius of curvature | Thickness | Material | Conic constant |
|---|---|---|---|---|---|
| S2 | aspheric surface | 21.2538 | 0.0955 | — | 14.4985 |
| S3 | aspheric surface | 4.5654 | 0.2780 | 1.535/55.78 | −59.8189 |
| S4 | aspheric surface | 0.5005 | 0.6813 | — | −0.8107 |
| S5 | aspheric surface | 1.2321 | 0.7660 | 1.636/23.78 | −0.0645 |
| S6 | aspheric surface | −11.8579 | 0.1703 | — | −100.0000 |
| STO | spherical surface | infinity | 0.1916 | — | — |
| S7 | aspheric surface | 2.0483 | 0.7580 | 1.535/55.78 | 9.0970 |
| S8 | aspheric surface | −0.5651 | 0.0300 | — | −3.0319 |
| S9 | aspheric surface | 6.0810 | 0.2960 | 1.636/23.78 | 61.2767 |
| S10 | aspheric surface | 1.0086 | 0.3000 | — | −12.3143 |
| S11 | spherical surface | infinity | 0.3000 | 1.517/64.17 | — |
| S12 | spherical surface | infinity | 0.2859 | — | — |
| S13 | spherical surface | infinity | — | — | — |

TABLE 17

The following table shows aspheric surface high-order term coefficients A4, A6, A8 and A10 of aspheric lenses:

| Face numeral | A4 | A6 | A8 | A10 |
|---|---|---|---|---|
| S1 | 7.3142E−04 | 1.1245E−03 | −1.7449E−04 | 1.9792E−05 |
| S2 | 1.4814E−02 | 1.4366E−03 | −2.3588E−03 | 5.3604E−04 |
| S3 | −6.2847E−03 | −5.7519E−02 | −3.5000E−04 | 1.3769E−04 |
| S4 | −9.0966E−02 | −1.5030E−01 | −4.3163E−01 | 6.9921E−01 |
| S5 | −6.7144E−02 | −1.6201E−01 | 2.0924E−01 | 1.7694E−01 |
| S6 | 3.4493E−02 | 4.5520E−01 | −1.3087E+00 | 3.8470E+00 |
| S7 | −2.3416E−01 | −9.3954E−01 | 1.7108E+00 | −4.9045E+00 |
| S8 | −3.7397E−01 | 8.7318E−01 | −2.2575E−01 | −6.4321E−01 |
| S9 | −4.9238E−01 | −2.3565E−01 | −4.4359E−01 | 2.4466E−01 |
| S10 | −2.3909E−01 | −5.1087E−02 | 4.7148E−02 | −1.5139E−02 |

TABLE 18

| f1 (mm) | −39.07 | f (mm) | 0.75 |
|---|---|---|---|
| f2 (mm) | −1.06 | Fno | 2.08 |
| f3 (mm) | 1.74 | TTL (mm) | 4.54 |
| f4 (mm) | 0.91 | | |
| f5 (mm) | −1.88 | | |

TABLE 20

The following table shows aspheric surface high-order term coefficients A4, A6, A8 and A10 of aspheric lenses:

| Face numeral | A4 | A6 | A8 | A10 |
|---|---|---|---|---|
| S1 | −4.8603E−03 | 8.1846E−04 | −8.6812E−08 | −5.1292E−06 |
| S2 | 3.5651E−02 | −1.1351E−02 | 2.7237E−03 | −2.4824E−04 |
| S3 | −5.4003E−03 | −7.0795E−04 | 3.8303E−05 | −1.1424E−04 |
| S4 | −2.1283E−01 | −4.5992E−02 | 7.0486E−02 | 8.7880E−02 |
| S5 | −1.2636E−01 | 1.8145E−02 | 1.3520E−01 | 2.0869E−01 |
| S6 | −5.6880E−02 | 9.4303E−01 | −1.4746E+00 | 1.9862E+00 |
| S7 | −1.4521E−01 | −1.2406E+00 | 4.3552E+00 | −8.1944E+00 |
| S8 | −3.8405E−01 | −2.8437E−01 | 1.8469E−01 | 1.0871E−02 |
| S9 | −4.7989E−01 | −2.6839E−01 | −5.5823E−01 | 6.9740E−02 |
| S10 | −2.2109E−01 | −1.6921E−02 | 6.5996E−02 | −5.2172E−02 |

TABLE 21

| f1 (mm) | −37.68 | f (mm) | 0.81 |
|---|---|---|---|
| f2 (mm) | −1.03 | Fno | 2.08 |
| f3 (mm) | 1.64 | TTL (mm) | 4.84 |
| f4 (mm) | 0.91 | | |
| f5 (mm) | −2.03 | | |

The Seventh Embodiment

Referring to FIG. 31 to FIG. 35, an ultra-wide angle camera lens according to the seventh embodiment satisfies conditions in table 19 to table 21.

TABLE 19

| Face numeral | Type of surface | Radius of curvature | Thickness | Material | Conic constant |
|---|---|---|---|---|---|
| OBJ | spherical surface | infinity | infinity | — | — |
| S1 | aspheric surface | 6.8396 | 0.3880 | 1.535/55.78 | 6.1705 |
| S2 | aspheric surface | 5.0235 | 0.6143 | — | 9.1224 |
| S3 | aspheric surface | −987.0000 | 0.2780 | 1.535/55.78 | −998.9662 |
| S4 | aspheric surface | 0.5586 | 0.4300 | — | −0.8441 |
| S5 | aspheric surface | 1.3542 | 0.7660 | 1.636/23.78 | −0.5787 |
| S6 | aspheric surface | −4.1014 | 0.1642 | — | −100.0000 |
| STO | spherical surface | infinity | 0.1654 | — | — |
| S7 | aspheric surface | 2.3091 | 0.7580 | 1.535/55.78 | 11.0951 |
| S8 | aspheric surface | −0.5553 | 0.0322 | — | −2.8262 |
| S9 | aspheric surface | 6.0217 | 0.2960 | 1.636/23.78 | 55.6042 |
| S10 | aspheric surface | 1.0719 | 0.3000 | — | −14.7630 |
| S11 | spherical surface | infinity | 0.3000 | 1.517/64.17 | — |
| S12 | spherical surface | infinity | 0.3460 | — | — |
| S13 | spherical surface | infinity | — | — | — |

The Eighth 8

Referring to FIG. 36 to FIG. 40, an ultra-wide angle camera lens according to the eighth embodiment satisfies conditions in table 22 to table 24.

TABLE 22

| Face numeral | Type of surface | Radius of curvature | Thickness | Material | Conic constant |
|---|---|---|---|---|---|
| OBJ | spherical surface | infinity | infinity | — | — |
| S1 | aspheric surface | 7.2590 | 0.3880 | 1.535/55.78 | 7.2577 |
| S2 | aspheric surface | 5.3598 | 0.5733 | — | 10.4841 |
| S3 | aspheric surface | 24.4013 | 0.2780 | 1.535/55.78 | −998.9662 |
| S4 | aspheric surface | 0.5927 | 0.6277 | — | −0.7191 |
| S5 | aspheric surface | 1.2017 | 0.7660 | 1.636/23.78 | −0.1465 |
| S6 | aspheric surface | −4.6338 | 0.1049 | — | −118.4032 |
| STO | spherical surface | infinity | 0.1341 | — | — |
| S7 | aspheric surface | 2.8874 | 0.7580 | 1.535/55.78 | 17.6000 |
| S8 | aspheric surface | −0.5453 | 0.0519 | — | −2.9019 |
| S9 | aspheric surface | −890.0000 | 0.2960 | 1.636/23.78 | 55.6042 |
| S10 | aspheric surface | 1.0231 | 0.3000 | — | −14.7630 |
| S11 | spherical surface | infinity | 0.3000 | 1.517/64.17 | — |
| S12 | spherical surface | infinity | 0.2601 | — | — |
| S13 | spherical surface | infinity | — | — | — |

TABLE 23

The following table shows aspheric surface high-order term coefficients A4, A6, A8 and A10 of aspheric lenses:

| Face numeral | A4 | A6 | A8 | A10 |
|---|---|---|---|---|
| S1 | −4.8603E−03 | 8.1846E−04 | −8.6812E−08 | −5.1292E−06 |
| S2 | 3.5651E−02 | −1.1351E−02 | 2.7237E−03 | −2.4824E−04 |
| S3 | −5.4003E−03 | −7.0795E−04 | 3.8303E−05 | −1.1424E−04 |
| S4 | −2.1283E−01 | −4.5992E−02 | 7.0486E−02 | 8.7880E−02 |
| S5 | −1.2636E−01 | 1.8145E−02 | 1.3520E−01 | 2.0869E−01 |
| S6 | −5.6880E−02 | 9.4303E−01 | −1.4746E+00 | 1.9862E+00 |
| S7 | −1.4521E−01 | −1.2406E+00 | 4.3552E+00 | −8.1944E+00 |
| S8 | −3.8405E−01 | −2.8437E−01 | 1.8469E−01 | 1.0871E−02 |
| S9 | −4.7989E−01 | −2.6839E−01 | −5.5823E−01 | 6.9740E−02 |
| S10 | −2.2109E−01 | −1.6921E−02 | 6.5996E−02 | −5.2172E−02 |

TABLE 24

| f1 (mm) | −40.66 | f (mm) | 0.84 |
|---|---|---|---|
| f2 (mm) | −1.12 | Fno | 2.08 |
| f3 (mm) | 1.53 | TTL (mm) | 4.84 |
| f4 (mm) | 0.92 | | |
| f5 (mm) | −1.55 | | |

The Ninth Embodiment

Referring to FIG. 41 to FIG. 45, an ultra-wide angle camera lens according to the eighth embodiment satisfies conditions in table 25 to table 27.

TABLE 25

| Face numeral | Type of surface | Radius of curvature | Thickness | Material | Conic constant |
|---|---|---|---|---|---|
| OBJ | spherical surface | infinity | infinity | — | — |
| S1 | aspheric surface | 11.2451 | 0.5912 | 1.535/55.78 | 6.6262 |
| S2 | aspheric surface | 8.0048 | 0.8944 | — | 9.6075 |
| S3 | aspheric surface | 144.2923 | 0.4236 | 1.535/55.78 | −998.9662 |
| S4 | aspheric surface | 0.8752 | 0.7050 | — | −0.8161 |
| S5 | aspheric surface | 2.2317 | 1.1671 | 1.636/23.78 | 0.0183 |
| S6 | aspheric surface | −6.4604 | 0.2545 | — | −118.4032 |
| STO | spherical surface | infinity | 0.3088 | — | — |
| S7 | aspheric surface | 3.4711 | 1.1549 | 1.535/55.78 | 11.4886 |
| S8 | aspheric surface | −0.8449 | 0.0486 | — | −2.8831 |
| S9 | aspheric surface | 9.5286 | 0.4510 | 1.636/23.78 | 55.6042 |
| S10 | aspheric surface | 1.5735 | 0.4571 | — | −14.7630 |
| S11 | spherical surface | infinity | 0.4571 | 1.517/64.17 | — |
| S12 | spherical surface | infinity | 0.6015 | — | — |
| S13 | spherical surface | infinity | — | — | — |

TABLE 26

The following table shows aspheric surface high-order term coefficients A4, A6, A8 and A10 of aspheric lenses:

| Face numeral | A4 | A6 | A8 | A10 |
|---|---|---|---|---|
| S1 | −1.3740E−03 | 9.9663E−05 | −4.5533E−09 | −1.1588E−07 |
| S2 | 1.0078E−02 | −1.3821E−03 | 1.4286E−04 | −5.6084E−06 |
| S3 | −1.5267E−03 | −8.6206E−05 | 2.0090E−06 | −2.5810E−06 |
| S4 | −6.0166E−02 | −5.6004E−03 | 3.6970E−03 | 1.9854E−03 |
| S5 | −3.5722E−02 | 2.2095E−03 | 7.0912E−03 | 4.7149E−03 |
| S6 | −1.6080E−02 | 1.1483E−01 | −7.7343E−02 | 4.4874E−02 |
| S7 | −4.1051E−02 | −1.5106E−01 | 2.2843E−01 | −1.8513E−01 |
| S8 | −1.0857E−01 | −3.4627E−02 | 9.6869E−03 | 2.4560E−04 |
| S9 | −1.3566E−01 | −3.2681E−02 | −2.9280E−02 | 1.5756E−03 |
| S10 | −6.2503E−02 | −2.0604E−03 | 3.4615E−03 | −1.1787E−03 |

TABLE 27

| f1 (mm) | −54.68 | f (mm) | 1.25 |
|---|---|---|---|
| f2 (mm) | −1.62 | Fno | 2.08 |
| f3 (mm) | 2.66 | TTL (mm) | 7.51 |
| f4 (mm) | 1.38 | | |
| f5 (mm) | −2.93 | | |

The Tenth Embodiment

Referring to FIG. 46 to FIG. 50, an ultra-wide angle camera lens according to the eighth embodiment satisfies conditions in table 28 to table 30.

TABLE 28

| Face numeral | Type of surface | Radius of curvature | Thickness | Material | Conic constant |
|---|---|---|---|---|---|
| OBJ | spherical surface | infinity | infinity | — | — |
| S1 | aspheric surface | 6.8610 | 0.3880 | 1.535/55.78 | 6.4629 |
| S2 | aspheric surface | 4.8281 | 0.6109 | — | 8.7977 |
| S3 | aspheric surface | −10000.0000 | 0.2780 | 1.535/55.78 | −998.9662 |
| S4 | aspheric surface | 0.6128 | 0.5960 | — | −0.6933 |
| S5 | aspheric surface | 1.1650 | 0.7660 | 1.636/23.78 | −0.2794 |
| S6 | aspheric surface | −4.6855 | 0.0970 | — | −118.4032 |
| STO | spherical surface | infinity | 0.1289 | — | — |
| S7 | aspheric surface | 2.9254 | 0.7580 | 1.535/55.78 | 17.7770 |
| S8 | aspheric surface | −0.5552 | 0.0544 | — | −2.9036 |
| S9 | aspheric surface | −10000.0000 | 0.2960 | 1.636/23.78 | 55.6042 |
| S10 | aspheric surface | 1.0541 | 0.3000 | — | −14.7630 |
| S11 | spherical surface | infinity | 0.3000 | 1.517/64.17 | — |
| S12 | spherical surface | infinity | 0.2648 | — | — |
| S13 | spherical surface | infinity | — | — | — |

TABLE 29

The following table shows aspheric surface high-order term coefficients A4, A6, A8 and A10 of aspheric lenses:

| Face numeral | A4 | A6 | A8 | A10 |
|---|---|---|---|---|
| S1 | −4.8603E−03 | 8.1846E−04 | −8.6812E−08 | −5.1292E−06 |
| S2 | 3.5791E−02 | −1.1542E−02 | 2.8208E−03 | −2.6545E−04 |
| S3 | −5.4003E−03 | −7.0795E−04 | 3.8303E−05 | −1.1424E−04 |
| S4 | −2.1283E−01 | −4.5992E−02 | 7.0486E−02 | 8.7880E−02 |
| S5 | −1.2636E−01 | 1.8145E−01 | 1.3520E−01 | 2.0869E−01 |
| S6 | −5.6880E−02 | 9.4303E−01 | −1.4746E+00 | 1.9862E+00 |
| S7 | −1.4521E−01 | −1.2406E+00 | 4.3552E+00 | −8.1944E+00 |
| S8 | −3.8405E−01 | −2.8437E−01 | 1.8469E−01 | 1.0871E−02 |
| S9 | −4.7989E−01 | −2.6839E−01 | −5.5823E−01 | 6.9740E−02 |
| S10 | −2.2109E−01 | −1.6921E−02 | 6.5996E−02 | −5.2172E−02 |

TABLE 30

| f1 (mm) | −32.18 | f (mm) | 0.85 |
|---|---|---|---|
| f2 (mm) | −1.13 | Fno | 2.08 |
| f3 (mm) | 1.50 | TTL (mm) | 4.84 |
| f4 (mm) | 0.93 | | |
| f5 (mm) | −1.60 | | |

From first to tenth embodiments, conditional expressions satisfy conditions in the following table.

| Conditional expression | Embodiment | | | | | | | | | |
|---|---|---|---|---|---|---|---|---|---|---|
| | 1 | 2 | 3 | 4 | 5 | 6 | 7 | 8 | 9 | 10 |
| f/f1 | −0.023 | −0.019 | −0.022 | −0.020 | −0.021 | −0.019 | −0.022 | −0.021 | −0.023 | −0.026 |
| ImgH/f | 1.551 | 1.749 | 1.694 | 1.343 | 1.624 | 1.593 | 1.478 | 1.433 | 1.463 | 1.412 |
| f2/f4 | −1.176 | −1.192 | −1.120 | −1.075 | −1.125 | −1.168 | −1.131 | −1.226 | −1.175 | −1.212 |
| f2/f | −1.299 | −1.349 | −1.300 | −1.223 | −1.302 | −1.409 | −1.266 | −1.342 | −1.299 | −1.328 |
| DT31/DT52 | 1.168 | 1.292 | 1.096 | 1.314 | 1.303 | 1.184 | 1.197 | 1.128 | 1.070 | 1.106 |
| DT22/DT31 | 1.037 | 1.010 | 1.064 | 1.061 | 1.041 | 1.038 | 1.141 | 1.081 | 1.148 | |
| TTL/ImgH | 3.841 | 3.725 | 3.690 | 4.534 | 3.876 | 3.784 | 4.032 | 4.032 | 4.110 | 4.032 |
| T34/TTL | 0.075 | 0.084 | 0.072 | 0.099 | 0.073 | 0.080 | 0.068 | 0.049 | 0.075 | 0.047 |
| T23/TTL | 0.094 | 0.071 | 0.092 | 0.082 | 0.089 | 0.150 | 0.089 | 0.130 | 0.094 | 0.123 |
| CT1/CT5 | 1.311 | 0.667 | 0.757 | 0.855 | 0.985 | 1.311 | 1.311 | 1.311 | 1.311 | 1.311 |
| CT2/CT5 | 0.939 | 0.926 | 0.743 | 0.680 | 0.722 | 0.939 | 0.939 | 0.939 | 0.939 | 0.939 |
| ΣCT/TTL | 0.504 | 0.535 | 0.543 | 0.536 | 0.551 | 0.548 | 0.514 | 0.514 | 0.504 | 0.514 |
| R1/R2 | 1.405 | 1.376 | 1.417 | 1.362 | 1.411 | — | 1.362 | 1.354 | 1.405 | 1.421 |

It should be noted that the first lens L1 is configured as a biconcave lens in the sixth embodiment, and the ratio of R1/R2 is not in the numerical range of the embodiments of the present disclosure, so the ratio of R1/R2 is not shown in the corresponding table.

Reference throughout this specification to "one embodiment," "some embodiments," "explanatory embodiments", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In the description of the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, i.e. two, three and the like, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. An ultra-wide angle camera lens comprising: from an object side to an image side,
a first lens with negative refractive power, an image-side face of the first lens being concave;

a second lens with negative refractive power, an image-side face of the second lens being concave;

a third lens with positive refractive power, an object-side face of the third lens being convex;

a fourth lens with positive refractive power, an image-side face of the fourth lens being convex; and a fifth lens with negative refractive power, an image-side face of the fifth lens being concave, wherein the ultra-wide angle camera lens satisfies the following relation:

$-0.05 < f/f1 < 0$, and $1.2 < ImgH/f < 2$, wherein f represents an effective focus length of the ultra-wide angle camera lens, f1 represents an effective focus length of the first lens, and ImgH is half of a diagonal line of an effective pixel region on an imaging face.

2. The ultra-wide angle camera lens according to claim 1, wherein the ultra-wide angle camera lens satisfies the following relation:

$-1.4 < f2/f4 < -0.7$, and $-1.5 < f2/f < -1$, wherein, f2 represents an effective focus length of the second lens, and f4 represents an effective focus length of the fourth lens.

3. The ultra-wide angle camera lens according to claim 1, wherein the ultra-wide angle camera lens satisfies the following relation:

$1 < DT22/DT31 < 1.2$, and $1 < DT31/DT52 < 1.35$, wherein, DT22 represents an effective radius of the image-side face of the second lens, DT31 represents an effective radius of the object-side face of the third lens, and DT52 represents an effective radius of the image-side face of the fifth lens.

4. The ultra-wide angle camera lens according to claim 1, wherein, the ultra-wide angle camera lens satisfies the following relation:

$TTL/ImgH < 4.6$;

wherein, TTL represents a distance between an object-side face of the first lens and the imaging face along an axis.

5. The ultra-wide angle camera lens according to claim 1, wherein, the ultra-wide angle camera lens satisfies the following relation:

$0 < T34/TTL < 0.1$, and $0.05 < T23/TTL < 0.16$, wherein, T34 represents a spacing distance between the third lens and the fourth lens along an axis, TTL represents a distance between an object-side face of the first lens and an imaging face along the axis, and T23 represents a spacing distance between the second lens and the third lens along the axis.

6. The ultra-wide angle camera lens according to claim 1, wherein, the ultra-wide angle camera lens satisfies the following relation:

$0.4 < \Sigma CT/TTL < 0.6$, wherein, $\Sigma CT$ represents a sum of thicknesses of the first lens, the second lens, the third lens, the fourth lens and the fourth lens along an optical axis, and TTL represents a distance between an object-side face of the first lens and an imaging face along an axis.

7. The ultra-wide angle camera lens according to claim 1, wherein, the ultra-wide angle camera lens satisfies the following relation:

$0.6 < CT1/CT5 < 1.35$, and $0.65 < CT2/CT5 < 1$, wherein, CT1 represents a central thicknesses of the first lens along an optical axis, CT2 represents a central thicknesses of the second lens along the optical axis, and CT5 represents a central thicknesses of the fifth lens along the optical axis.

8. The ultra-wide angle camera lens according to claim 1, wherein, the ultra-wide angle camera lens satisfies the following relation:

$1 < R1/R2 < 1.5$, wherein, R1 represents a radius of curvature of an object-side face of the first lens, and R2 represents a radius of curvature of an object-side face of the second lens.

9. The ultra-wide angle camera lens according to claim 1, wherein, an image-side face of the third lens is convex, and an object-side face of the fourth lens is convex.

* * * * *